(12) United States Patent
Nagatomi

(10) Patent No.: US 8,310,910 B2
(45) Date of Patent: Nov. 13, 2012

(54) OPTICAL PICKUP DEVICE

(75) Inventor: Kenji Nagatomi, Kaizu (JP)

(73) Assignee: SANYO Electric Co., Ltd., Osaka (JP)

( * ) Notice: Subject to any disclaimer, the term of this patent is extended or adjusted under 35 U.S.C. 154(b) by 211 days.

(21) Appl. No.: 12/890,770

(22) Filed: Sep. 27, 2010

(65) Prior Publication Data

US 2011/0075544 A1 Mar. 31, 2011

(30) Foreign Application Priority Data

Sep. 28, 2009 (JP) ................................. 2009-223511

(51) Int. Cl.
*G11B 7/00* (2006.01)

(52) U.S. Cl. .................. 369/112.12; 369/44.23; 369/94; 369/112.03; 369/112.15

(58) Field of Classification Search ................ 369/44.23, 369/94, 112.03, 112.12, 112.15
See application file for complete search history.

(56) References Cited

U.S. PATENT DOCUMENTS

| | | | |
|---|---|---|---|
| 7,345,981 B2* | 3/2008 | Kim et al. ............... | 369/112.03 |
| 2005/0025002 A1 | 2/2005 | Saito et al. | |
| 2007/0171786 A1 | 7/2007 | Kobayashi et al. | |
| 2008/0049566 A1* | 2/2008 | Hamaguchi et al. ....... | 369/44.23 |
| 2008/0049580 A1* | 2/2008 | Hamaoka et al. ............. | 369/103 |
| 2008/0084797 A1* | 4/2008 | Sano et al. .................. | 369/44.23 |
| 2008/0165641 A1* | 7/2008 | Yoo et al. .................... | 369/47.17 |
| 2009/0135687 A1* | 5/2009 | Mori et al. ................... | 369/44.41 |
| 2009/0225645 A1* | 9/2009 | Nagatomi ............... | 369/112.23 |
| 2010/0014410 A1* | 1/2010 | Nakao et al. .................. | 369/103 |
| 2010/0182889 A1* | 7/2010 | Inoue et al. ................... | 369/103 |

FOREIGN PATENT DOCUMENTS

| JP | 2006-252716 A | 9/2006 |
|---|---|---|
| JP | 2006-260669 A | 9/2006 |

OTHER PUBLICATIONS

Notification of Ground for Rejection for related Korean Application No. 10-2010-83344 dated Mar. 29, 2012, pp. 1-6.

* cited by examiner

Primary Examiner — Wayne Young
Assistant Examiner — Brenda Bernardi

(57) ABSTRACT

An optical system of an optical pickup device includes an astigmatism element which imparts astigmatism to BD light reflected on BD and CD light reflected on CD, and a spectral element which disperses four light fluxes of BD light and four light fluxes of CD light by diffraction, the four light fluxes of BD light and the four light fluxes of CD light being obtained by dividing the BD light reflected on the BD and the CD light reflected on the CD by a first straight line parallel to a converging direction by the astigmatism element, and a second straight line perpendicular to the first straight line. A photodetector of the optical pickup device is provided with first and second sensor groups for respectively receiving the four light fluxes of BD light and the four light fluxes of CD light dispersed by the spectral element.

7 Claims, 18 Drawing Sheets

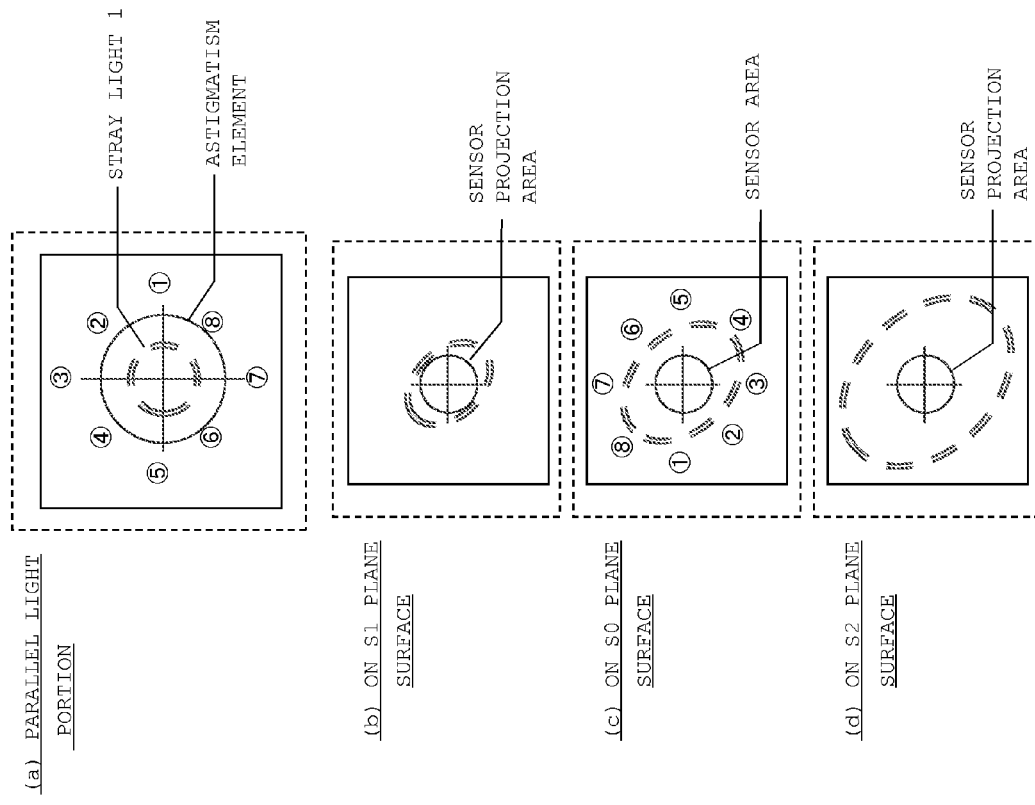
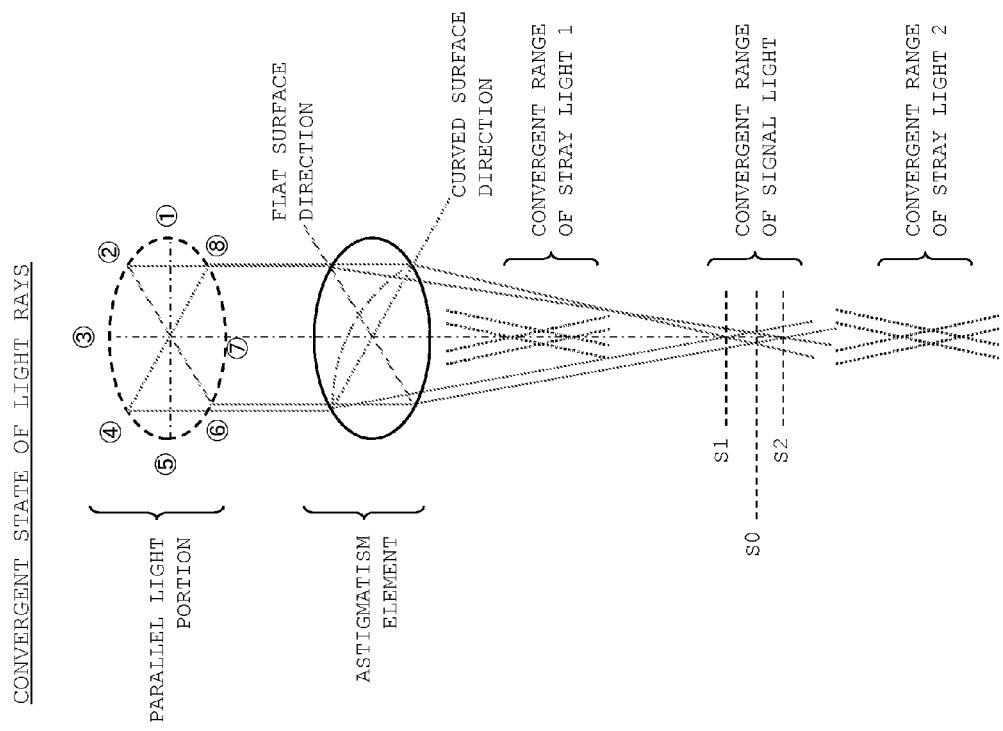

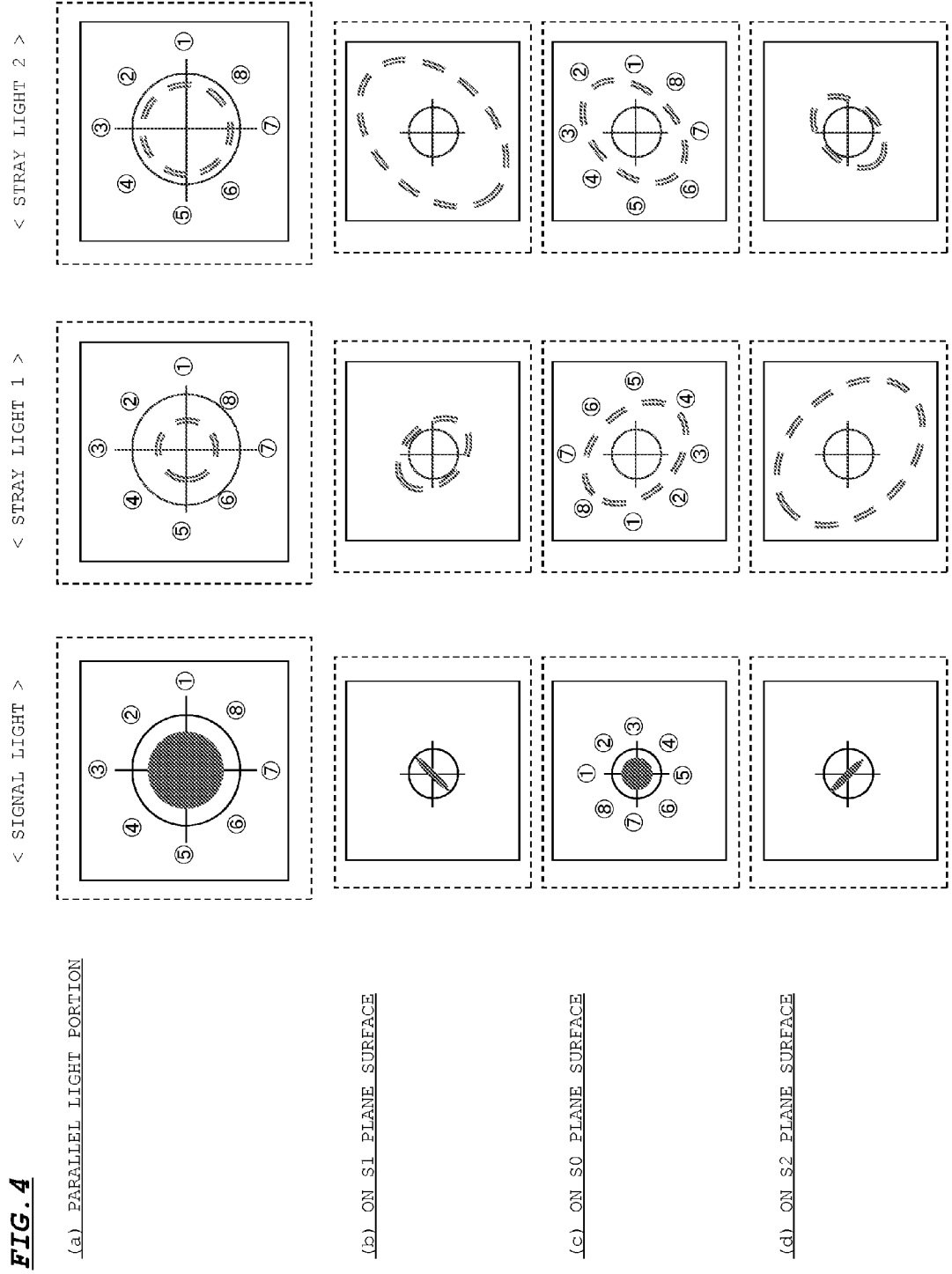

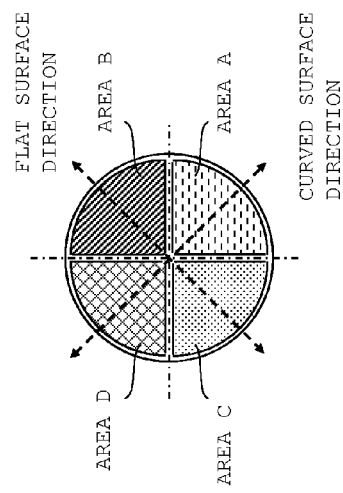
FIG. 5A  LIGHT FLUX DIVIDING PATTERN
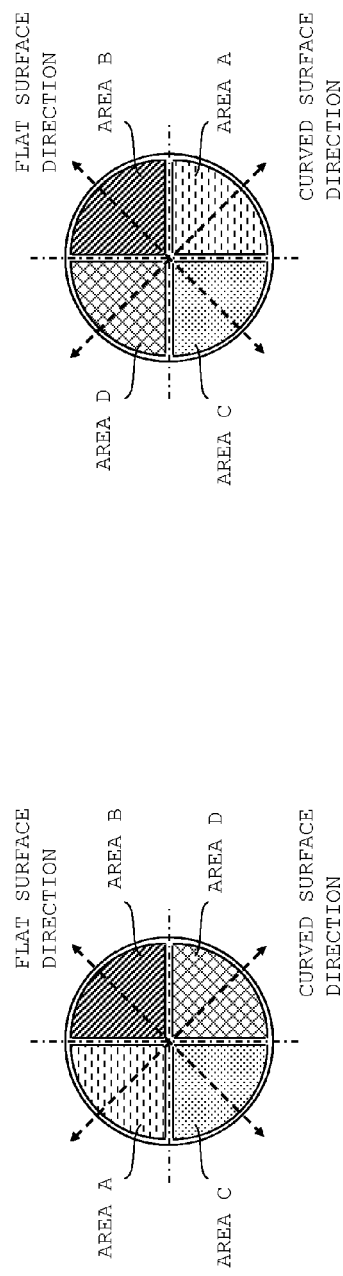
FIG. 5B  SIGNAL LIGHT
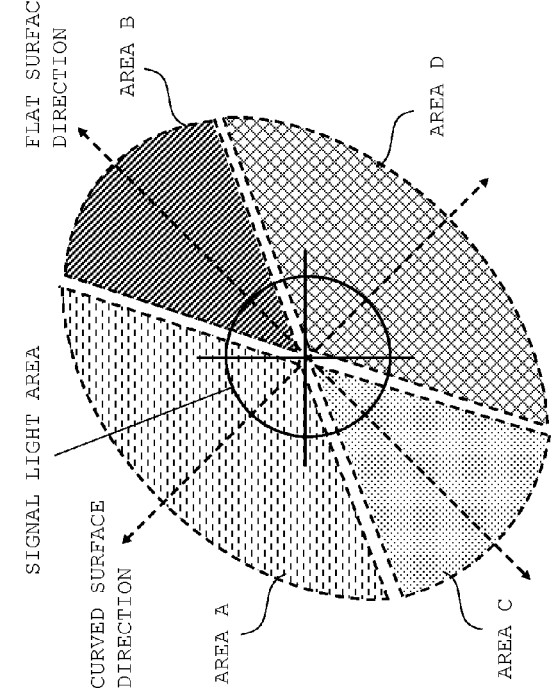
FIG. 5D  STRAY LIGHT 2
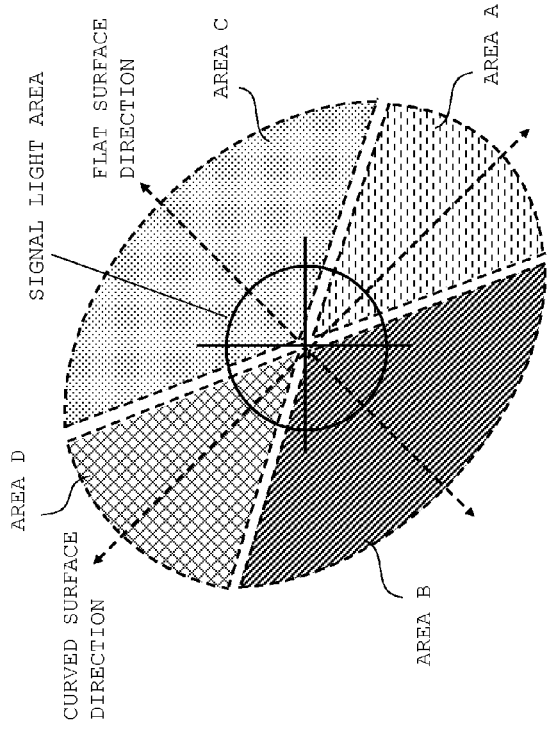
FIG. 5C  STRAY LIGHT 1

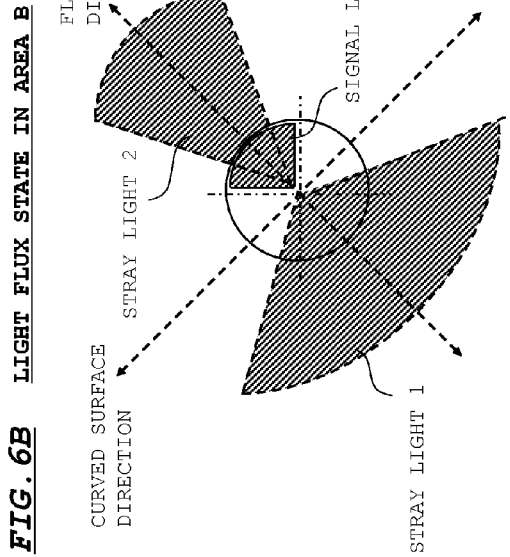
FIG. 6A  LIGHT FLUX STATE IN AREA A
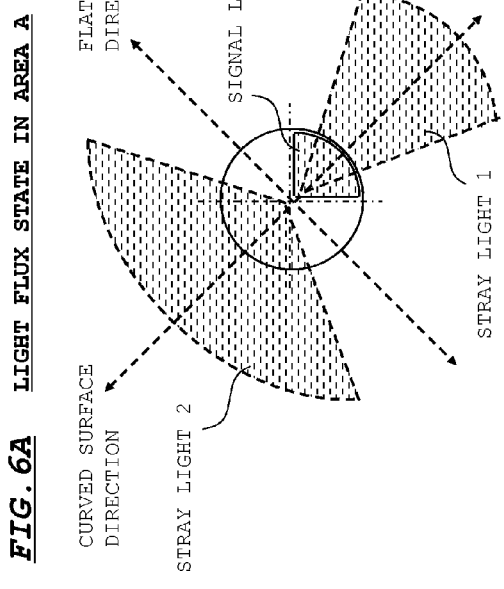
FIG. 6C  LIGHT FLUX STATE IN AREA C
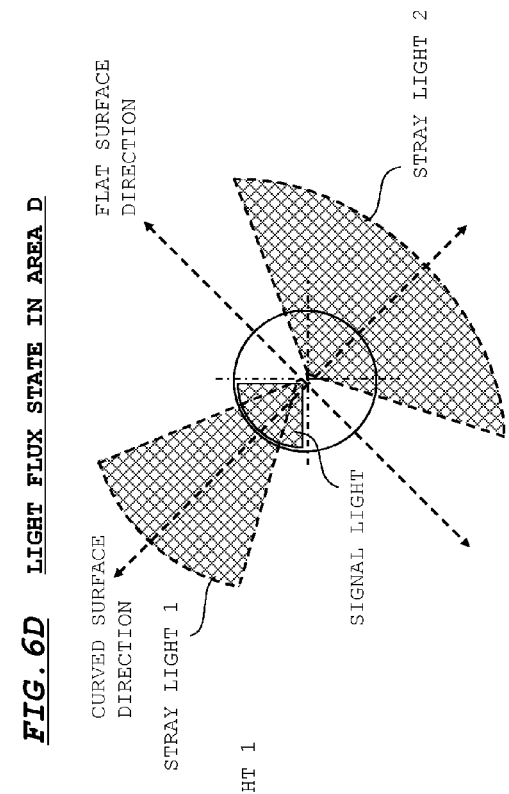
FIG. 6B  LIGHT FLUX STATE IN AREA B
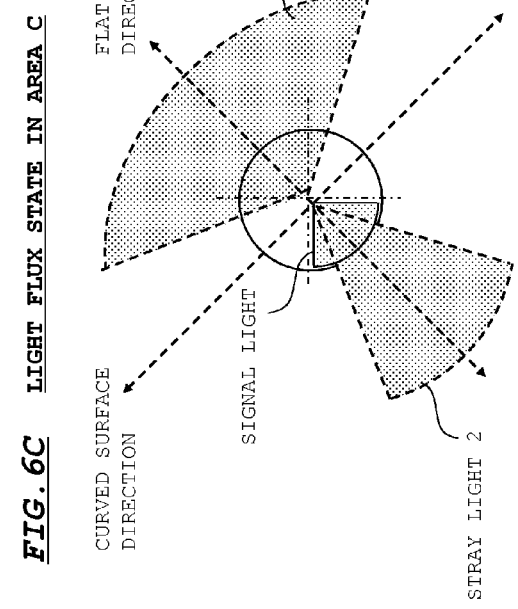
FIG. 6D  LIGHT FLUX STATE IN AREA D

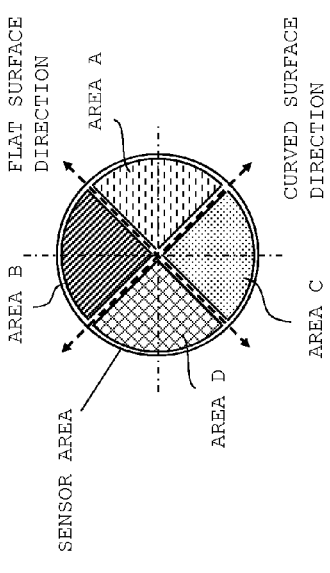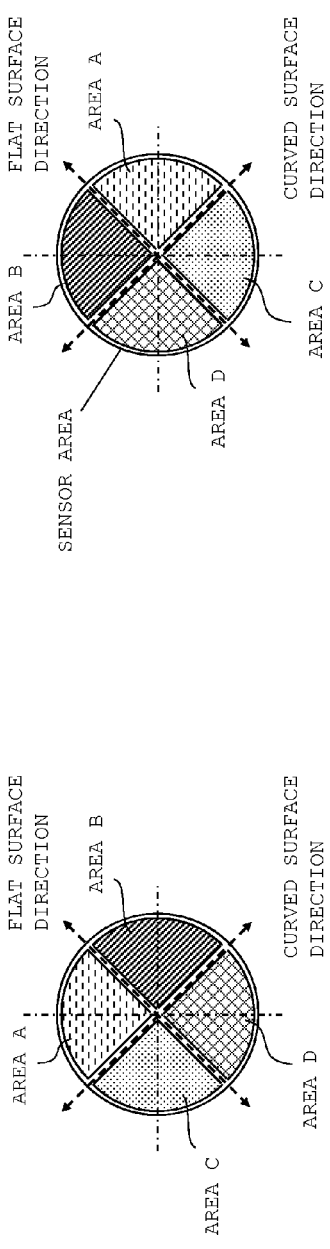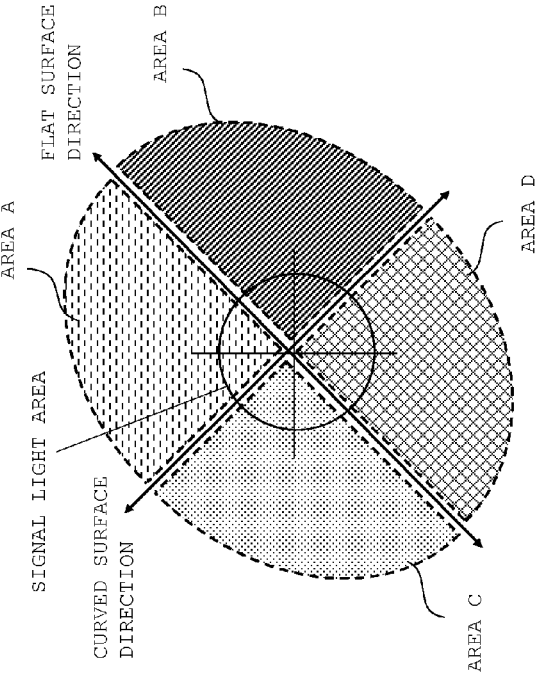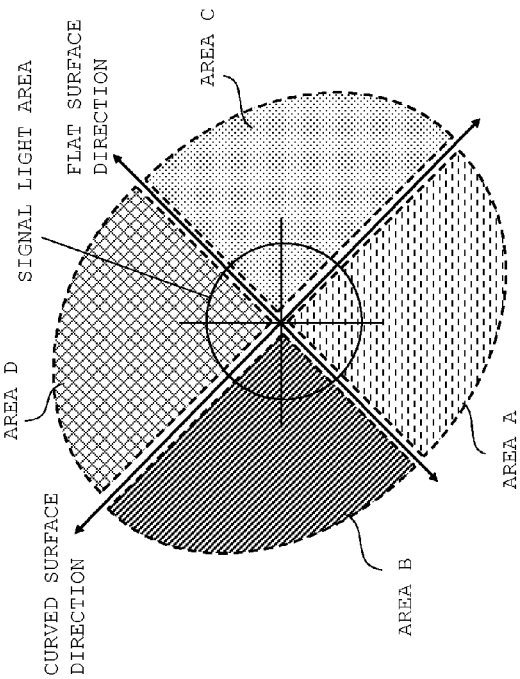

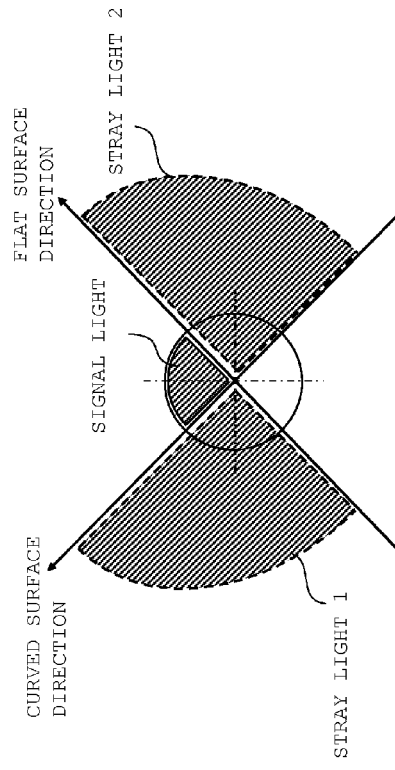
FIG. 8A    LIGHT FLUX STATE IN AREA A
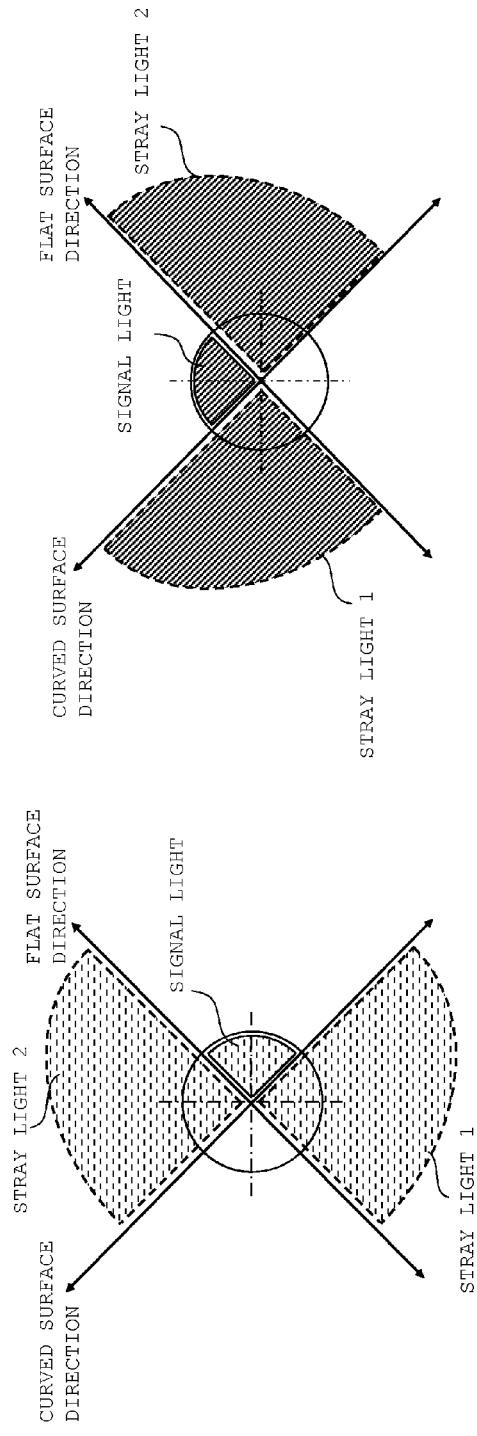
FIG. 8B    LIGHT FLUX STATE IN AREA B
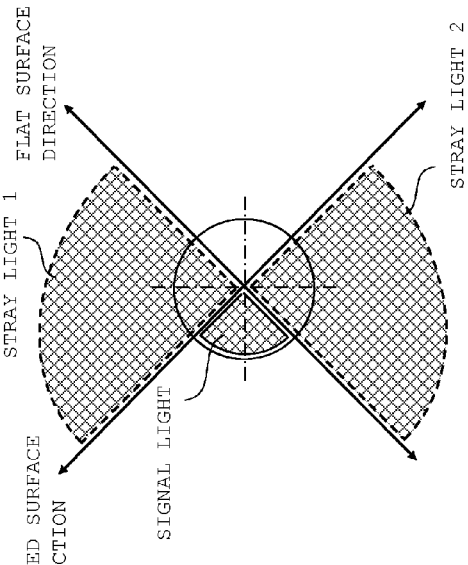
FIG. 8C    LIGHT FLUX STATE IN AREA C
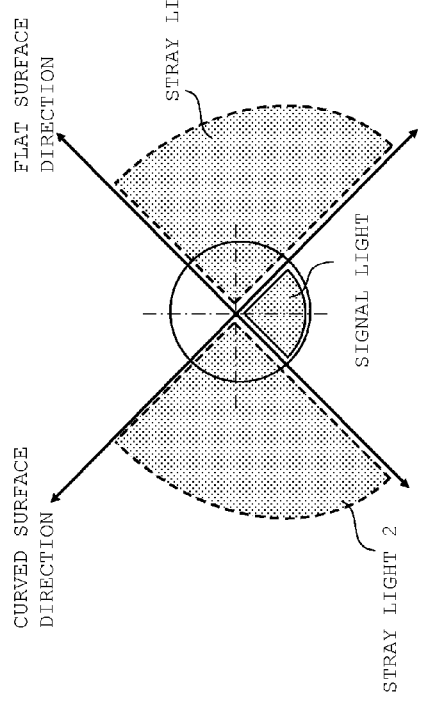
FIG. 8D    LIGHT FLUX STATE IN AREA D

LIGHT FLUX ON PLANE S0

PROVIDE ANGULAR CHANGE TO EACH AREA $FE = (A+B+E+F) - (C+D+G+H)$
$PP = (A+B+G+H) - (C+D+E+F)$

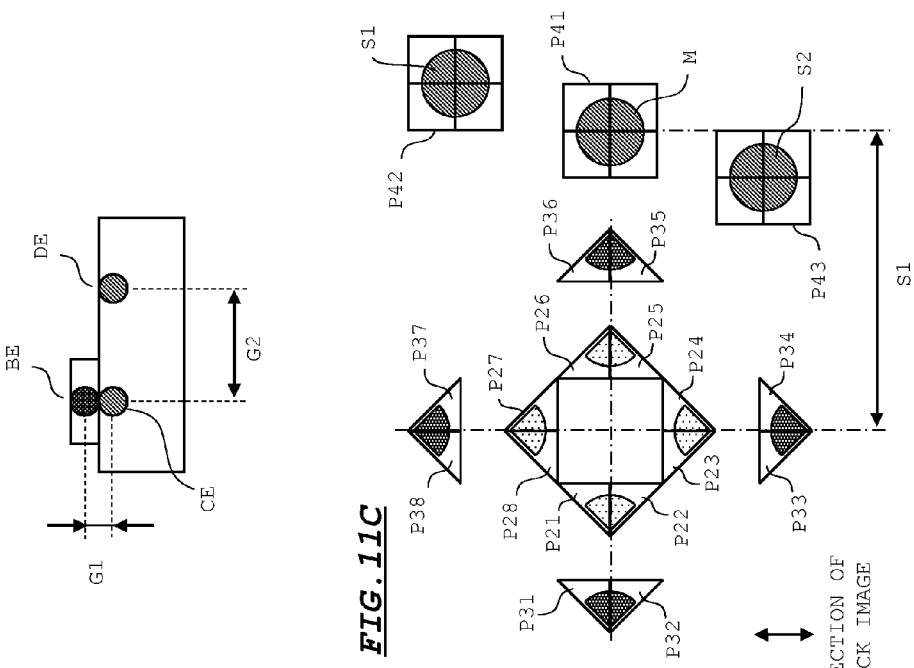
FIG. 11B
FIG. 11C
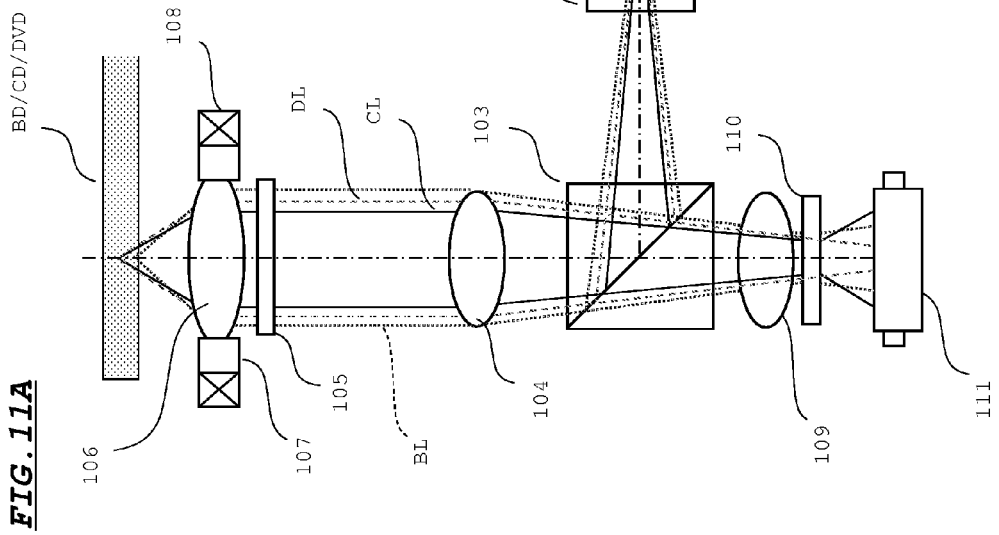
FIG. 11A

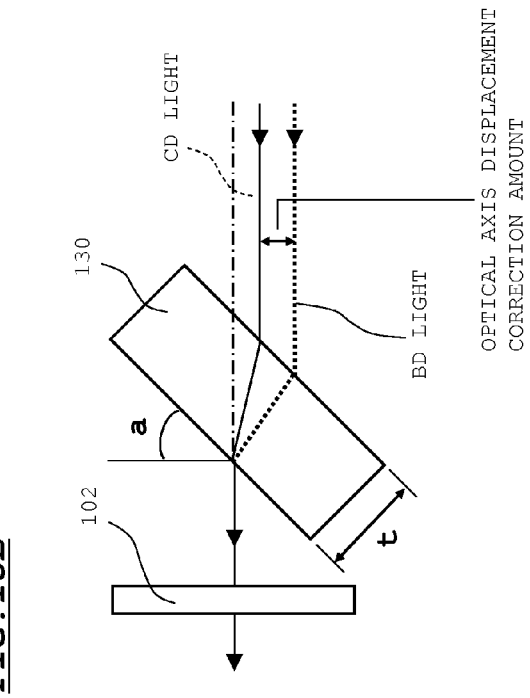
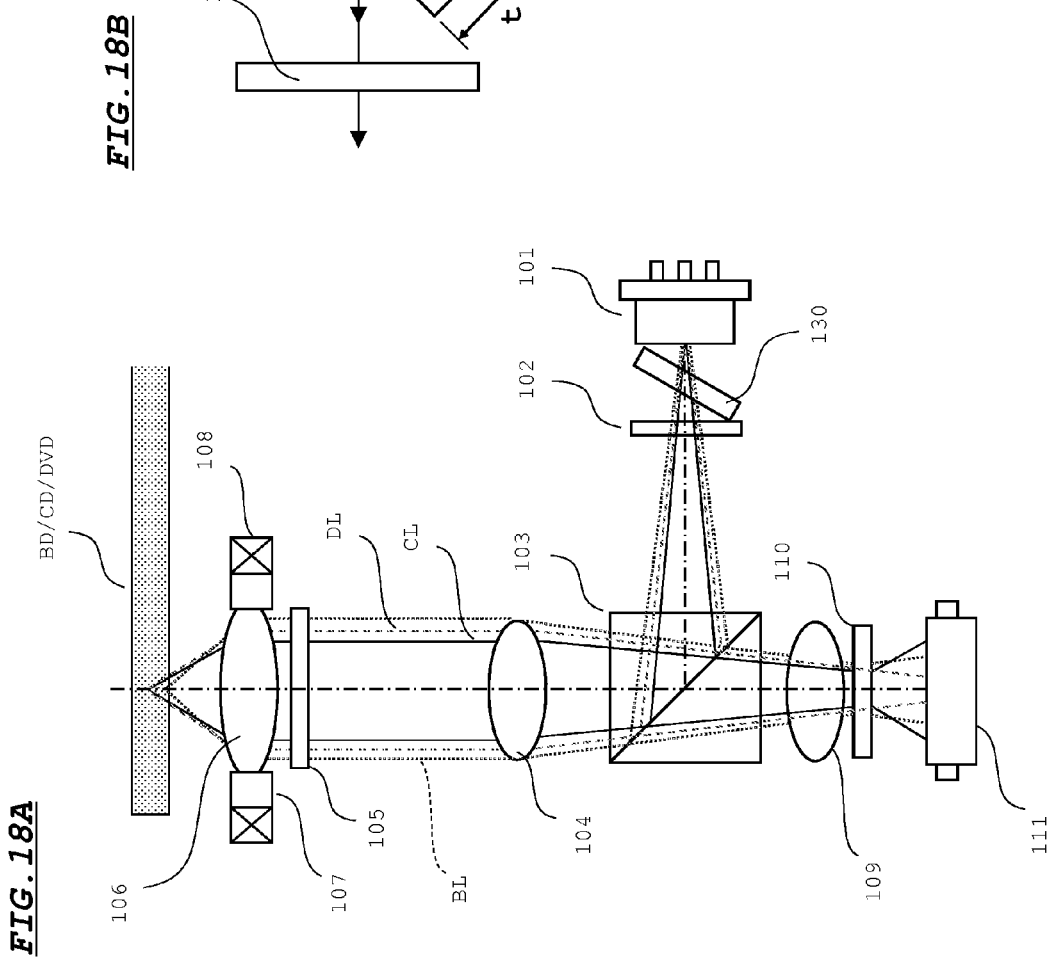

OPTICAL PICKUP DEVICE

This application claims priority under 35 U.S.C. Section 119 of Japanese Patent Application No. 2009-223511 filed Sep. 28, 2009, entitled "OPTICAL PICKUP DEVICE". The disclosure of the above applications is incorporated herein by reference.

BACKGROUND OF THE INVENTION

1. Field of the Invention

The present invention relates to an optical pickup device, and more particularly to a device preferable for use in irradiating a recording medium having plural recording layers laminated on each other with laser light of different wavelengths.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

As versatile discs have been developed in recent years, there has been increasing a demand for an optical pickup device compatible with e.g. CD (Compact Disc), DVD (Digital Versatile Disc), and Blu-ray Disc (hereinafter, called as "BD"). It is also necessary to provide measures against stray light as described above for such a compatible optical pickup device.

SUMMARY OF THE INVENTION

An optical pickup device according to a main aspect of the invention includes a first light source which emits laser light for BD; a second light source which emits laser light for CD; an objective lens portion which converges the laser light for BD and the laser light for CD on BD and CD, respectively; a photodetector which receives the laser light for BD reflected on the BD and the laser light for CD reflected on the CD; and an optical system which guides the laser light for BD emitted from the first light source, and the laser light for CD emitted from the second light source to the objective lens portion, and which guides the laser light for BD reflected on the BD and the laser light for CD reflected on the CD to the photodetector. In this arrangement, the optical system includes an astigmatism element which imparts astigmatism to the laser light for BD reflected on the BD and the laser light for CD reflected on the CD; and a spectral element which disperses four light fluxes of the laser light for BD by diffraction, and which disperses four light fluxes of the laser light for CD by diffraction, the four light fluxes of the laser light for BD and the four light fluxes of the laser light for CD being obtained by dividing the laser light for BD reflected on the BD and the laser light for CD reflected on the CD by a first straight line parallel to a converging direction by the astigmatism element and a second straight line perpendicular to the first straight line. Further, the photodetector is provided with a first sensor group which receives the four light fluxes of the laser light for BD dispersed by the spectral element to generate a reproduction signal, and a servo signal for use in controlling the objective lens portion; and a second sensor group which receives the four light fluxes of the laser light for CD dispersed by the spectral element to generate a reproduction signal, and a servo signal for use in controlling the objective lens portion.

BRIEF DESCRIPTION OF THE DRAWINGS

These and other objects, and novel features of the present invention will become more apparent upon reading the following detailed description of the embodiment along with the accompanying drawings.

FIGS. 2A and 2B are diagrams for describing the technical principle (as to how light rays propagate) in the embodiment.

FIG. 4 is a diagram for describing the technical principle (as to how light rays propagate) in the embodiment.

FIGS. 5A through 5D are diagrams for describing the technical principle (a light flux distribution state) in the embodiment.

FIGS. 6A through 6D are diagrams for describing the technical principle (a light flux distribution state) in the embodiment.

FIGS. 7A through 7D are diagrams for describing the technical principle (a light flux distribution state) in the embodiment.

FIGS. 8A through 8D are diagrams for describing the technical principle (a light flux distribution state) in the embodiment.

FIGS. 11A through 11C are diagrams showing an optical system of an optical pickup device in an inventive example.

FIGS. 18A and 18B are diagrams showing an optical system of an optical pickup device in another modification example.

Figure 1B:
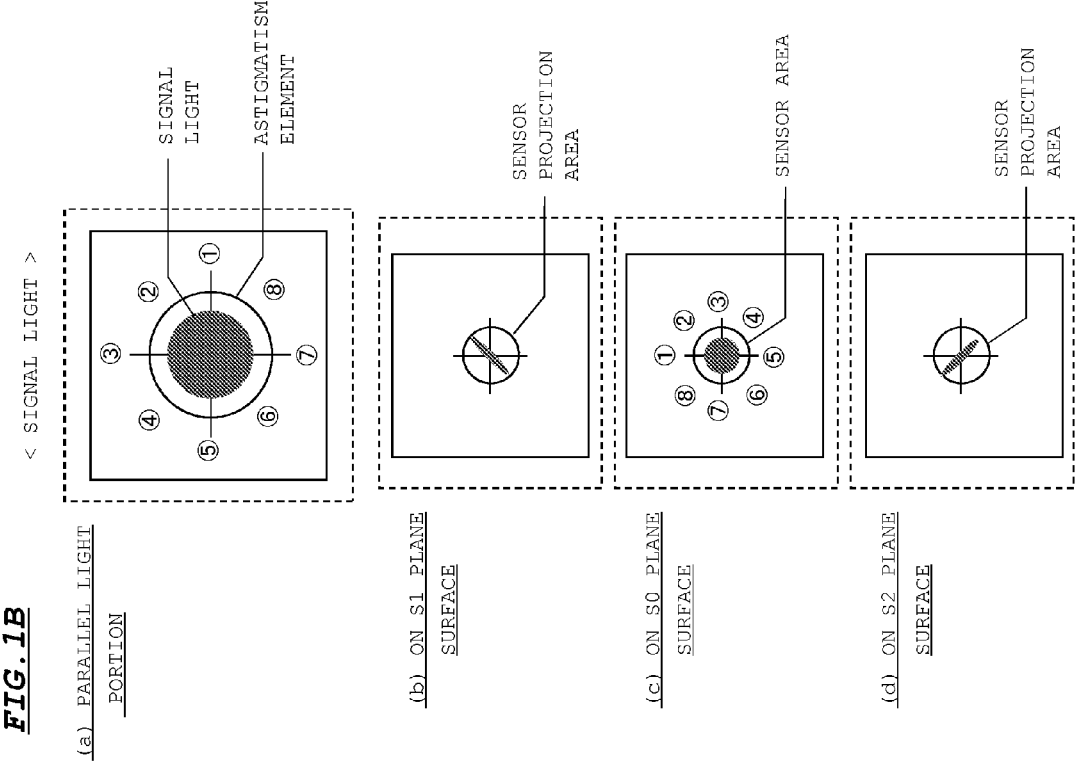
FIGS. 1A and 1B are diagrams for describing a technical principle (as to how light rays propagate) in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle which is applied to the embodiment of the invention is described referring to FIGS. 1A through 10D. The embodiment is described based on the premise that a recording medium having plural recording layers in a laminated direction is irradiated with laser light. In the following, out of the plural recording layers, a recording layer on which laser light is converged is particularly called as a "target recording layer".

Figure 1A:
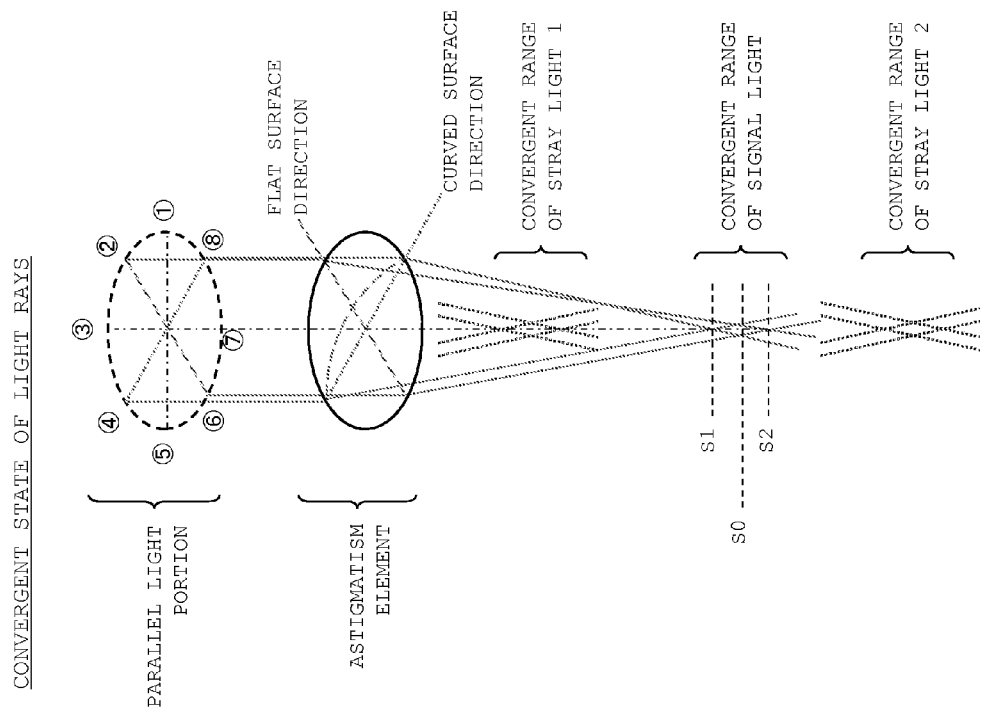

FIG. 1A is a diagram showing a convergent state of signal light and stray light, in the case where laser light (signal light) reflected on a targeted recording layer is entered into an astigmatism element such as an anomorphic lens as parallel light. "Stray light 1" is laser light reflected on a recording layer adjacent to the targeted recording layer at a rearward position of the target recording layer with respect to the laser light incident side, and "stray light 2" is laser light reflected on a recording layer adjacent to the targeted recording layer at a forward position of the targeted recording layer with respect to the laser light incident side. FIG. 1A shows a state that signal light is focused on the targeted recording layer.

As shown in FIG. 1A, a focal line is defined on a plane S1 by convergence of signal light in a "curved surface direction" in FIG. 1A, and a focal line is defined on a plane S2 by convergence of signal light in a "flat surface direction" perpendicular to the curved surface direction, by the function of the anomorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0. In this example, to simplify the description on the astigmatism function by the anomorphic lens, the terms "curved surface direction" and "flat surface direction" are used. Actually, however, as far as the anomorphic lens has a function of defining focal lines at different positions from each other, the anomorphic lens may have a curvature in the "flat surface direction" shown in FIG. 1A. In the case where laser light is entered into the anomorphic lens in a convergence state, the shape of the anomorphic lens in the "flat surface direction" may be linear (curvature radius=∞).

As shown in FIG. 1A, the focal line position of stray light 1 (in FIG. 1A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

The sections (a) through (d) in FIG. 1B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 1A and the section (a) in FIG. 1B, in the case where eight positions (positions 1 through 8: in FIGS. 1A and 1B, the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 1B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 1B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 1B on the plane S0.

Sections (a) through (d) in FIG. 2B are diagrams respectively showing beam configurations and light ray passing positions of stray light 1 on the parallel light portion, and the planes S1, S0, and S2. As shown in the section (a) of FIG. 2B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 2B on the plane S0.

Figure 3B:
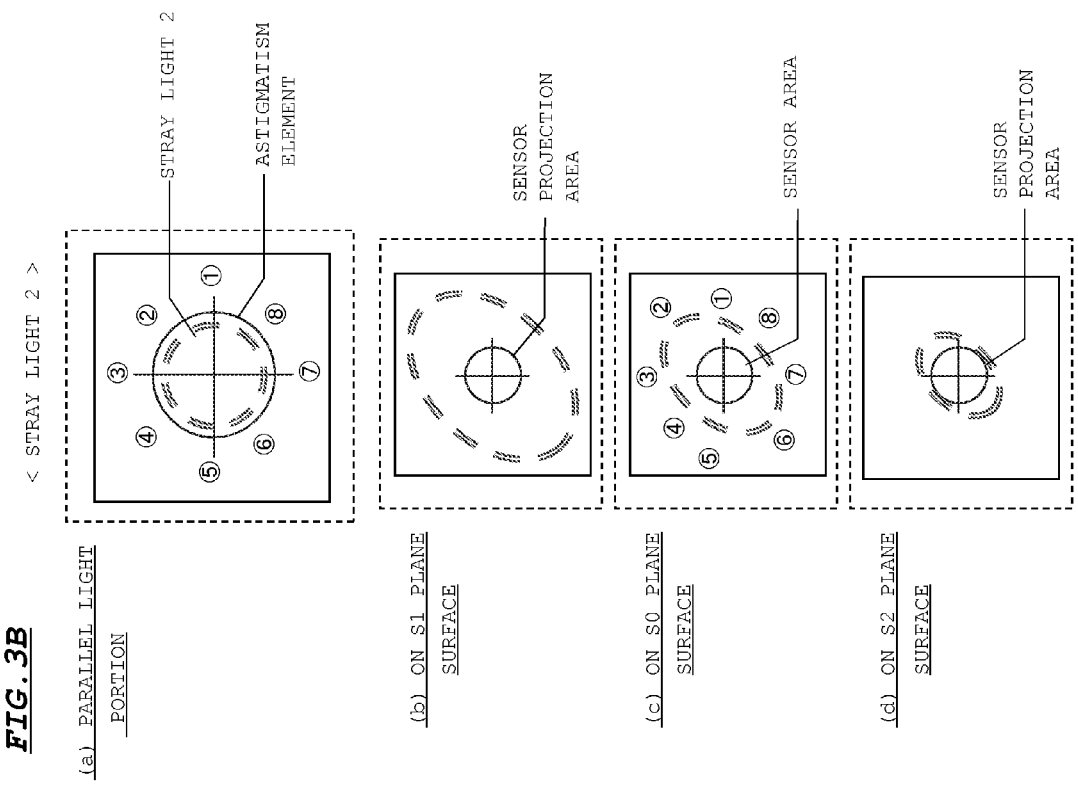
FIGS. 3A and 3B are diagrams for describing the technical principle (as to how light rays propagate) in the embodiment.
Figure 3A:
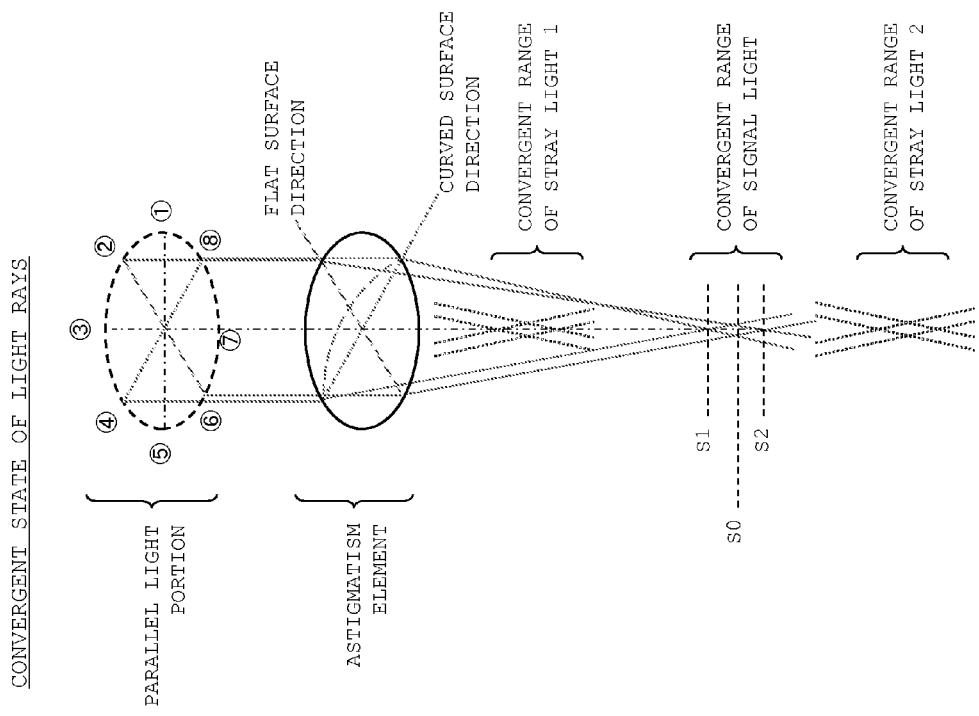

Sections (a) through (d) in FIG. 3B are diagrams respectively showing beam configurations and light ray passing positions of stray light 2 on the parallel light portion, and the planes S1, S0, and S2. As shown in the section (a) of FIG. 3B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 3B on the plane S0.

FIG. 4 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 4, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 5A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 5B due to the above phenomenon. Stray light 1 and stray light 2 in the light flux areas A through D respectively have distributions on the plane S0 as shown in FIGS. 5C and 5D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 6A through 6D. In this case, the signal light in each of the light flux areas is necessarily superimposed on one of the stray light 1 and the stray light 2 in the corresponding same light flux area. Accordingly, if the signal light in each of the light flux areas is received by a sensing portion on the photodetector, at least the stray light 1 or the stray light 2 in the corresponding light flux area is simultaneously entered into the corresponding sensing portion, which may deteriorate a detection signal.

In contrast, as shown in FIG. 7A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 7B due to the above phenomenon. Stray light 1 and stray light 2 in the light flux areas A through D respectively have distributions on the plane S0, as shown in FIGS. 7C and 7D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 8A through 8D. In this case, the signal light in each of the light flux areas is not superimposed with any one of the stray light 1 and the stray light 2 in the corresponding light flux area. Accordingly, if only the signal light is allowed to be received by a sensing portion, after the light fluxes (of signal light, stray light 1, and stray light 2) in each of the light flux areas are dispersed in different directions from each other, only the signal light is allowed to be entered into the corresponding sensing portion to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

Figure 9B:
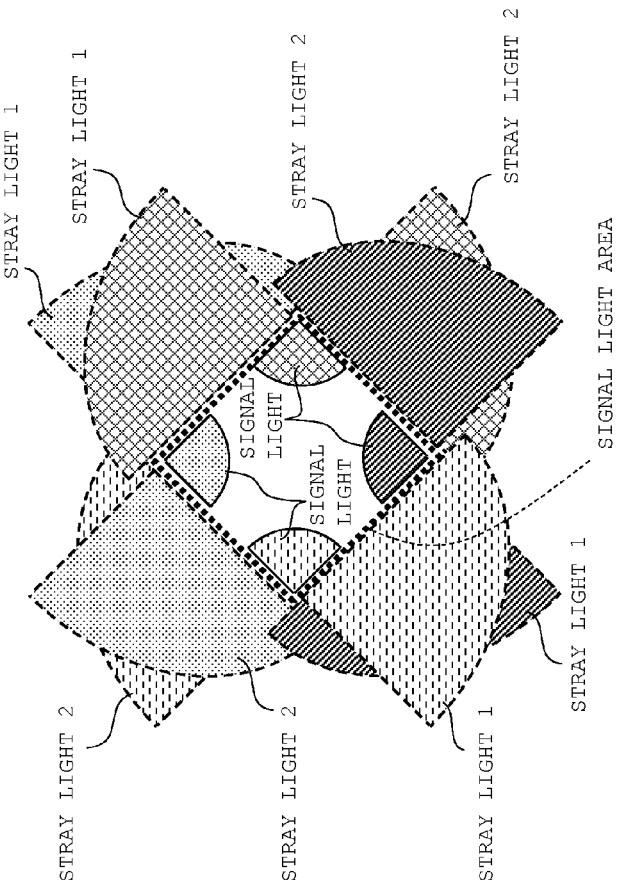
FIGS. 9A and 9B are diagrams for describing the technical principle (a relation between an angle changing function and a light flux distribution state) in the embodiment.
Figure 9A:
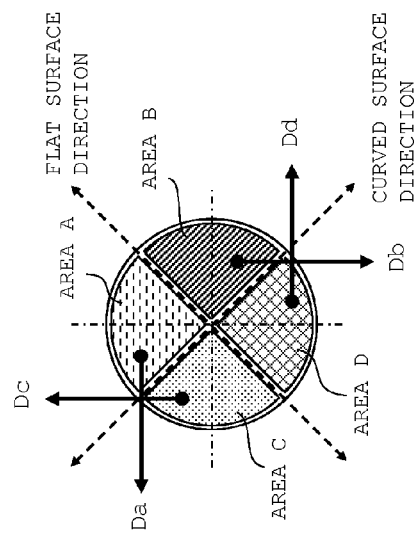

FIGS. 9A and 9B are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 7A are changed from each other by a predetermined angle. In this example, as shown in FIG. 9A, the propagating directions of light fluxes (of signal light, stray light 1, and stray light 2) passing the four light flux areas A through D are respectively changed into directions Da, Db, Dc, and Dd by a predetermined angle amount □ (not shown). The directions Da, Db, Dc, and Dd are inclined with respect to each of the flat surface direction and the curved surface direction by 45 degrees.

In this example, adjusting the angle amount a with respect to the directions Da, Db, Dc, and Dd enables to distribute the signal light, the stray light 1, and the stray light 2 in each of the light flux areas on the plane S0, as shown in FIG. 9B. As a result, as shown in FIG. 9B, a signal light area where only the signal light exists can be defined on the plane S0. Setting a sensing portion of the photodetector on the signal light area allows only the signal light in each of the light flux areas to be received on the corresponding sensing portion.

Figure 10A:
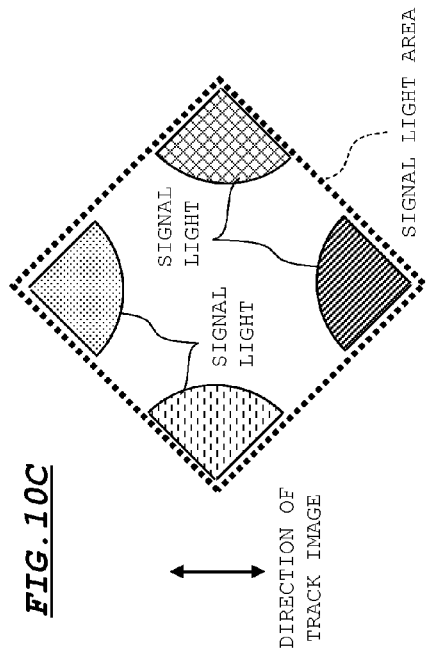
FIGS. 10A through 10D are diagrams showing a sensing portion disposing method in the embodiment.
Figure 10C:
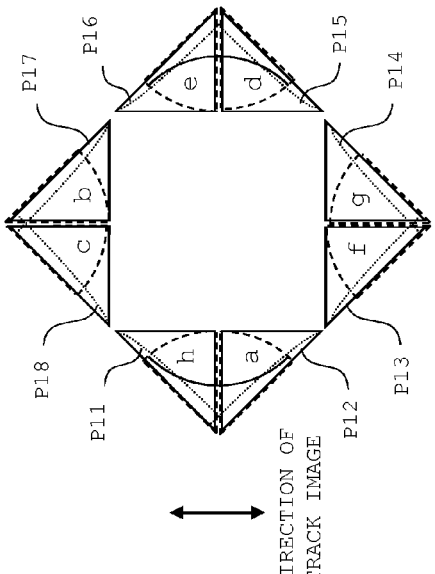
Figure 10B:
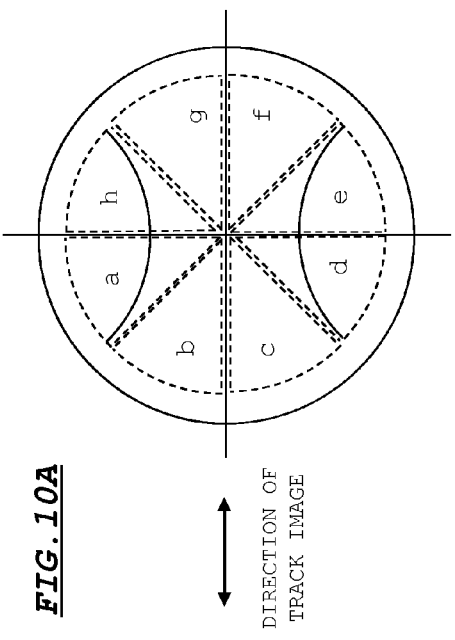
Figure 10D:
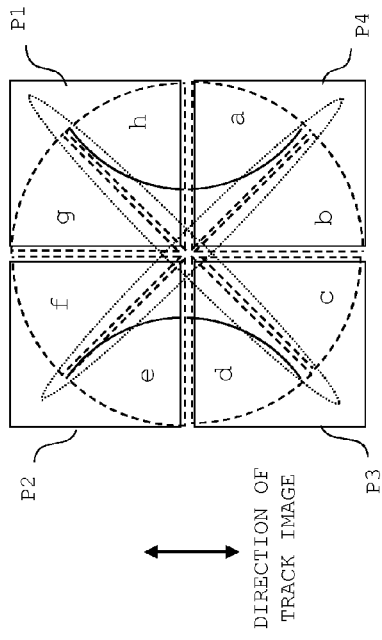

FIGS. 10A through 10D are diagrams for describing a method for arranging a sensing portion. FIGS. 10A and 10B are diagrams showing a light flux dividing method and a sensing portion based on a conventional astigmatism method. FIGS. 10C and 10D are diagrams showing a light flux dividing method and a sensing portion based on the above principle. In this example, a track direction is inclined with respect to each of the flat surface direction and the curved surface direction by 45 degrees. To simplify the description, a light flux is divided into eight light flux areas "a" through "h" in FIGS. 10A, 10B and 10D. In FIGS. 10A, 10B and 10D, diffraction images (track images) by a track groove are indicated by the solid lines. In FIGS. 10B and 10D, beam configurations in an out-of-focus state are indicated by the dotted lines.

It is known that a superimposed state of a zero-th order diffraction image and a first order diffraction image of signal light resulting from a track groove is obtained by (track pitch× NA of objective lens). As shown in FIGS. 10A, 10B, and 10D, a condition for forming a first order diffraction image within the four light flux areas "a", "d", "e", and "h" is expressed by: wavelength/(track pitch×NA of objective lens)>√2.

In the conventional astigmatism method, sensing portions P1 through P4 (a four-division sensor) of a photodetector are set as shown in FIG. 10B. In this arrangement, assuming that detection signal components based on the light intensities of the light flux areas "a" through "h" are expressed by A through H, a focus error signal FE and a push-pull signal PP (tracking error signal) are obtained by the equations (1) and (2).

$$FE=(A+B+E+F)-(C+D+G+H) \quad (1)$$

$$PP=(A+B+G+H)-(C+D+E+F) \quad (2)$$

On the other hand, in the distribution state shown in FIG. 9B, as described above, signal light is distributed in the state as shown in FIG. 10C within the signal light area. In this case, the signal light passing the light flux areas "a" through "h" in FIG. 10A is as shown in FIG. 10D. Specifically, the signal light passing the light flux areas "a" through "h" in FIG. 10A is guided to the light flux areas "a" through "h" shown in FIG. 10D on the plane S0 where the sensing portion of the photodetector is disposed.

Accordingly, setting the sensing portions P11 through P18 at the positions of the light flux areas "a" through "h" shown in FIG. 10D in the superimposed state shown in FIG. 10D enables to generate a focus error signal and a push-pull signal by performing the same computation as applied in FIG. 10B. Specifically, assuming that detection signals from the sensing portions which receive light fluxes in the light flux areas "a" through "h" are expressed by A through H, similarly to the arrangement shown in FIG. 10B, a focus error signal FE and a push-pull signal PP can be obtained by performing computation in accordance with the equation (1) and (2).

As described above, according to the principle, signal light, and stray light 1 and 2 in a parallel light portion is divided into four light flux areas A through D by two straight lines parallel to the flat surface direction and the curved surface direction shown in FIG. 1A, the light passing the light flux areas A through D is dispersed, and signal light in each of the light flux areas A through D after the dispersion is individually received by two-divided light receiving portions (two-division sensors), whereby a focus error signal and a push-pull signal (tracking error signal) can be generated by performing the same computation as the computation applied to process based on the conventional astigmatism method. Further, a reproduction RF signal can be generated by summing up the signals from the respective sensing portions. As described above, the focus error signal, the push-pull signal (tracking error signal), and the reproduction RF signal obtained as described above have high quality since there is no likelihood that stray light may be superimposed on the signal light area.

Example

In the following, an example based on the above principle is described.

FIG. 11A is a diagram showing an optical system of an optical pickup device in the inventive example. The optical pickup device in the inventive example is applicable to BD, CD, and DVD.

As shown in FIG. 11A, the optical pickup device is provided with a semiconductor laser 101, a diffraction grating 102, a polarized beam splitter (PBS) 103, a collimator lens 104, a quarter wavelength plate 105, an objective lens 106, a holder 107, an objective lens actuator 108, a detection lens 109, a spectral element 110, and a photodetector 111.

The semiconductor laser 101 accommodates, in a certain CAN, three laser elements which respectively emit laser light for CD and having a wavelength of about 785 nm (hereinafter, called as "CD light"), laser light for DVD and having a wavelength of about 650 nm (hereinafter, called as "DVD light"), and laser light for BD and having a wavelength of about 405 nm (hereinafter, called as "BD light").

FIG. 11B is a diagram showing a disposition pattern of the laser elements in the semiconductor laser 101. In this example, an arrangement example in which each laser element is mounted in a monolithic state is shown. FIG. 11B shows the semiconductor laser 101 when viewed from a beam emission side. In FIG. 11B, BE, CE, and DE respectively indicate emission points of BD light, CD light, and DVD light.

In the arrangement shown in FIG. 11B, an emission layer of BD light is disposed above an emission layer of CD light and DVD light in such a manner that the emission point BE of BD light is located immediately above the emission point CE of CD light. With this arrangement example, it is possible to set a gap G1 between the emission point CE of CD light and the emission point BE of BD light significantly smaller than a gap G2 between the emission point DE of DVD light and the emission point CE of CD light. It is thus possible to maximally suppress optical axis displacement between CD light and BD light, out of the laser light to be emitted from the semiconductor laser 101.

More specifically, a solder layer, an electrode layer, an insulating layer, and the like are disposed between the emission layers. Accordingly, the gap G1 between the emission point CE of CD light, and the emission point BE of BD light is formed resulting from the thickness of these layers. Considering a layer forming process and a heat generation problem, the minimum value of the gap G1 is about 1 μm at most. In view of this, normally, the gap G1 is set to about several μm.

As will be described later, the gap G2 between the emission point CE of CD light and the emission point DE of DVD light is set to such a value that DVD light is properly irradiated onto a sensor for DVD light. Accommodating three light sources in a certain CAN as described above enables to simplify the arrangement of an optical system as compared with an arrangement provided with plural CANs.

Referring back to FIG. 11A, the diffraction grating 102 acts on DVD light, out of BD light, CD light, and DVD light, to divide the DVD light into a main beam and two sub beams.

Figure 13:
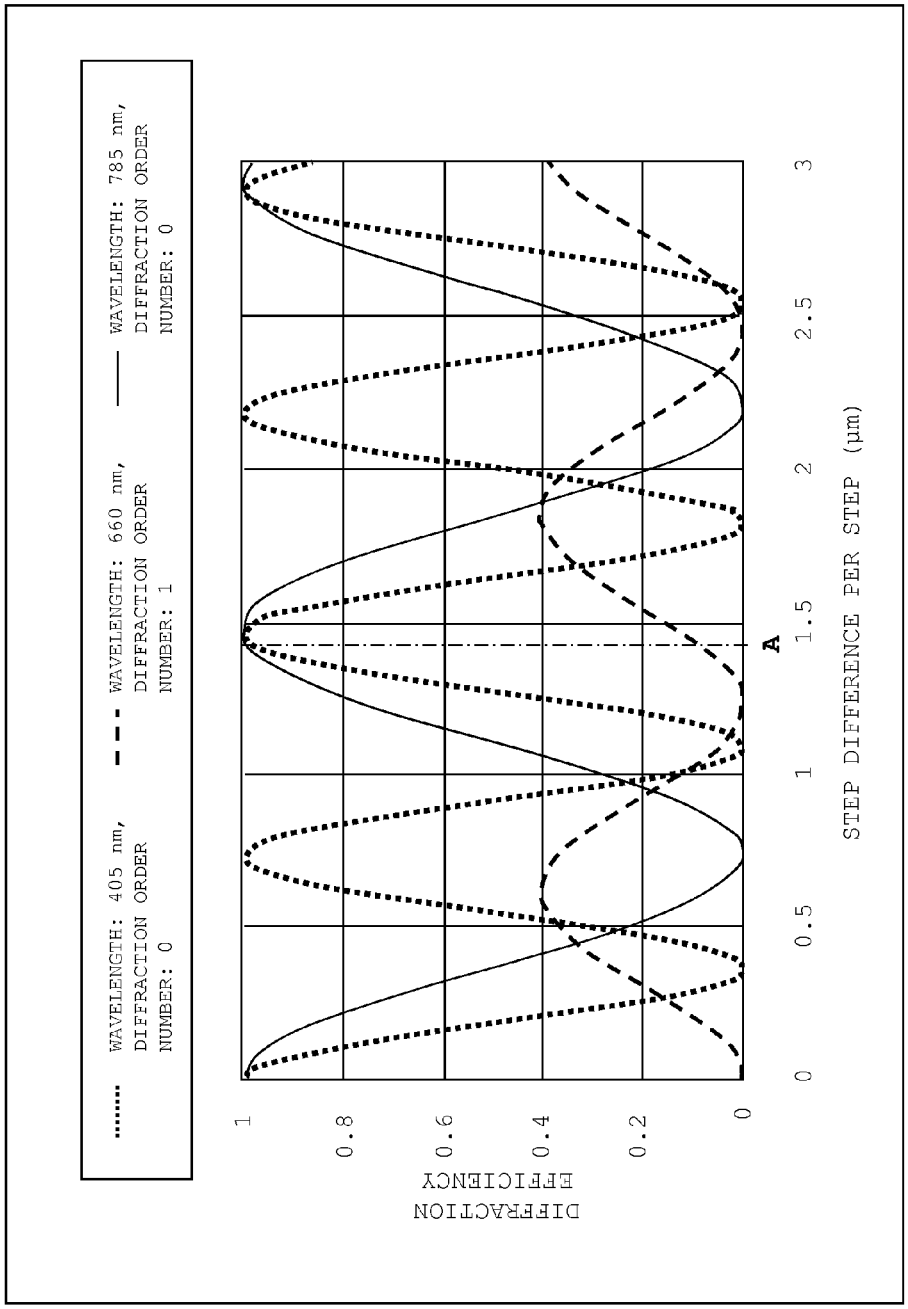
FIG. 13 is a diagram for describing a characteristic of a diffraction grating in the inventive example.

FIG. 13 is a characteristic diagram showing a simulation result of a relation between a step difference per step, and a diffraction efficiency, in the case where the diffraction grating 102 has two steps. In this case, by setting the step per step to the height A as shown in FIG. 13, the diffraction grating 102 is configured to diffract only DVD light, without substantially diffracting BD light and CD light.

Referring back to FIG. 11A, the PBS 103 reflects BD light, CD light, and DVD light to be entered from the side of the diffraction grating 102, and transmits BD light, CD light, and DVD light to be entered from the side of the collimator lens 104. The collimator lens 104 converts BD light, CD light, and DVD light to be entered from the side of the PBS 103 into parallel light. The quarter wavelength plate 105 converts BD light, CD light, and DVD light to be entered from the side of the collimator lens 104 into circularly polarized light, and converts BD light, CD light, and DVD light to be entered from the side of the objective lens 106 into linearly polarized light in a polarization direction orthogonal to the polarization direction in which BD light, CD light, and DVD light enter from the side of the collimator lens 104.

The objective lens 106 is configured to properly converge BD light, CD light, and DVD light on BD, CD, and DVD, respectively. The objective lens 106 is driven in a focusing direction and a tracking direction by the objective lens actuator 108 in a state that the objective lens 106 is held on the holder 107.

The detection lens 109 imparts astigmatism to BD light, CD light, and DVD light that have been entered from the side of the PBS 103. BD light, CD light, and DVD light imparted with astigmatism are entered into the spectral element 110. The detection lens 109 corresponds to the astigmatism element in the above technical principle.

The spectral element 110 has a stepped diffraction pattern (diffraction hologram) on an incident surface thereof. As shown in FIG. 9A, out of BD light, CD light, and DVD light that have been entered into the spectral element 110, BD light and CD light are each divided into four light fluxes by diffraction by the spectral element 110, whereby the propagating directions of the respective light fluxes are changed.

The photodetector 111 has a sensor layout as shown in FIG. 11C. Specifically, the photodetector 111 has a BD sensor group (sensing portions P21 through P28) for receiving BD light separated by the spectral element 110, and a CD sensor group (sensing portions P31 through P38) for receiving CD light separated by the spectral element 110. Further, the photodetector 111 has a DVD sensor group (four division sensors P41 through P43) for receiving DVD light (zero-th order diffraction light) that has been transmitted through the spectral element 110 without diffraction. These sensor groups are disposed on the plane S0 shown in FIG. 1A.

Figure 12B:
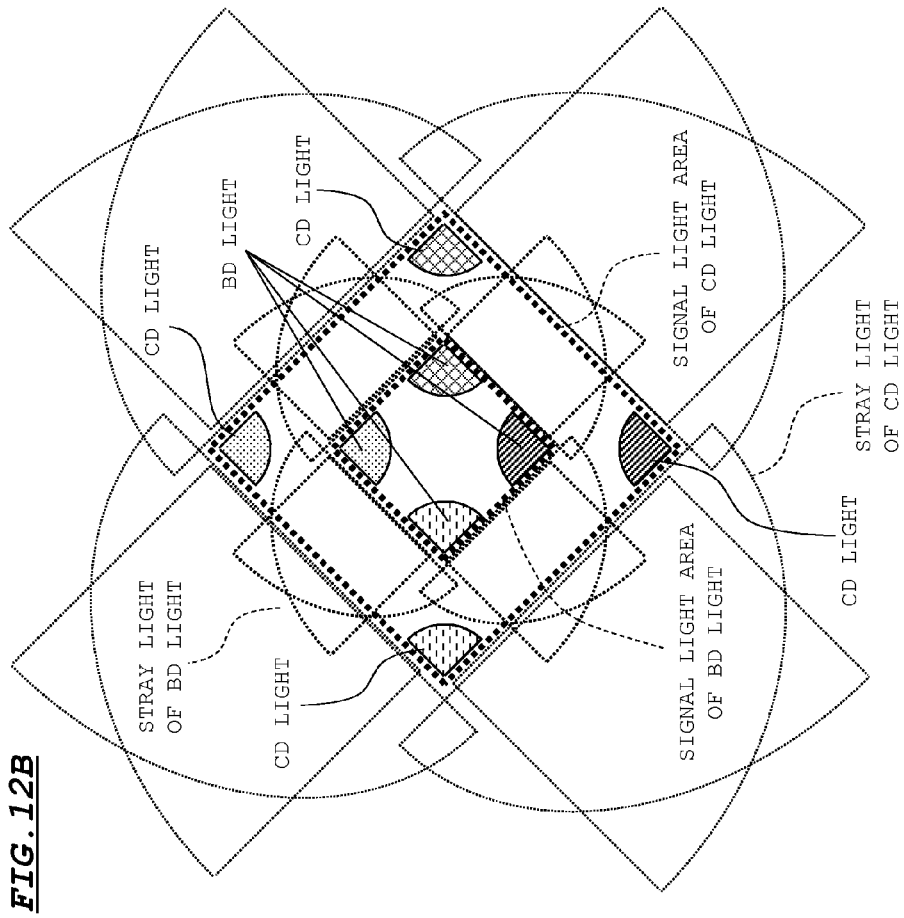
FIGS. 12A and 12B are diagrams for describing an arrangement of a spectral element in the inventive example.
Figure 12A:
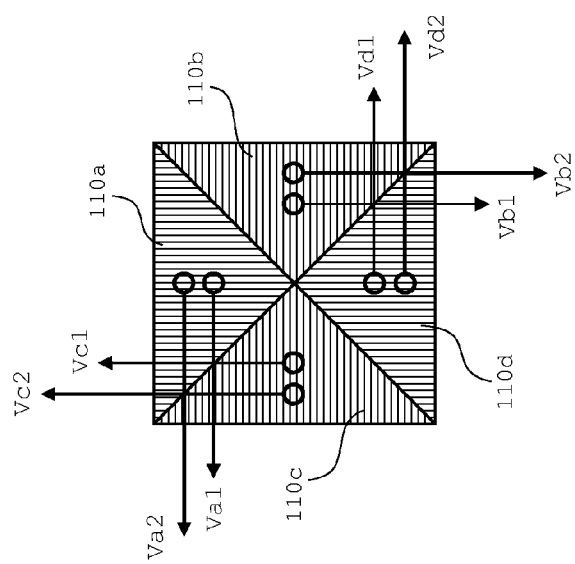

FIG. 12A is a diagram showing an arrangement of the spectral element 110. FIG. 12A is a plan view of the spectral element 110 when viewed from the side of the detection lens 109.

The spectral element 110 is made of a square transparent plate, and has a stepped diffraction pattern (diffraction hologram) on a light incident surface thereof. As shown in FIG. 12A, the light incident surface is divided into four diffraction areas 110*a* through 110*d*. The spectral element 110 is disposed posterior to the detection lens 109 to allow BD light and CD light that have been transmitted through the light flux areas A through D shown in FIG. 9A to respectively enter into the diffraction areas 110*a* through 110*d*.

The diffraction areas 110*a* through 110*d* diffract entered BD light in directions Va1 through Vd1 by minus first order diffraction, and diffract entered CD light in directions Va2 through Vd2 by minus first order diffraction. The directions Va1 through Vd1 coincide with the directions Da through Dd shown in FIG. 9A, and the directions Va2 through Vd2 also coincide with the directions Da through Dd shown in FIG. 9A. Further, the minus first order diffraction angle with respect to BD light is the same in each of the diffraction areas 110*a* through 110*d*, and the minus first order diffraction angle with respect to CD light is also the same in each of the diffraction areas 110*a* through 110*d*.

The diffraction angle is proportional to a value obtained by multiplying a diffraction order number by a wavelength. In this example, the diffraction angle of BD light becomes a value of diffraction order number×wavelength=−405 degrees, and the diffraction angle of CD light becomes a value of diffraction order number×wavelength=−785 degrees. Thus, the diffraction angle of CD light is about two times bigger than the diffraction angle of BD light.

With the diffraction areas 110*a* through 110*d* having the above arrangement, BD light and CD light have a distribution as shown in FIG. 12B on the light receiving surface of the photodetector 111. As shown in FIG. 12B, a signal light area of BD light free of stray light of BD light, and a signal light area of CD light free of stray light of CD light are formed on the light receiving surface of the photodetector 111. In this example, the sensing portions P21 through P28 shown in FIG. 11C are disposed on corners of the signal light area of BD light, and the sensing portions P31 through P38 shown in FIG. 11C are disposed on corners of the signal light area of CD light. Thus, only signal light of BD light is received on the BD sensor group (sensing portions P21 through P28), and only signal light of CD light is received on the CD sensor group (sensing portions P31 through P38), respectively.

Further, in this example, since the gap G1 between the emission point BE of BD light and the emission point CE of CD light is as small as several μm, the BD sensor group and the CD sensor group are disposed in a state that the centers thereof are aligned with each other in FIG. 11C. Alternatively, the respective centers of the BD sensor group and the CD sensor group may be adjusted depending on the gap G1. In particular, in the case where a servo signal having enhanced precision is required, the respective centers of the BD sensor group and the CD sensor group may be adjusted depending on the gap G1.

In this example, optical axes of BD light and CD light are displaced from each other by the gap G1 shown in FIG. 11B. As a result, if the spectral element 110 is disposed at such a position that BD light is uniformly irradiated onto the diffraction areas 110*a* through 110*d*, CD light may be entered into the spectral element 110 in a state displaced by the gap G1. In this case, four light fluxes of CD light separated by the diffraction areas 110*a* through 110*d* are not entered into the CD sensor group (sensing portions P31 through P38) in a state of fan-like shape or quarter-circle shape, as shown in FIG. 11C, but are entered into the CD sensor group in a slightly deformed state from a quarter-circle shape. However, the optical axis displacement of CD light is as small as about several μm as described above, there is no likelihood that four light fluxes of CD light may be greatly deformed from a fan-like shape or a quarter-circle shape, on the light receiving surface of the photodetector 111. Thus, it is conceived that an error of a signal from the photodetector 111 resulting from this deformation is negligibly small.

The diffraction pattern to be formed on the diffraction areas 110a through 110d is configured to have a high zero-th order diffraction efficiency with respect to DVD light, and have a high minus first order diffraction efficiency with respect to BD light and CD light. In a stepped diffraction pattern, the diffraction efficiency is adjusted by the number of steps and a stepper step of a diffraction pattern, and the diffraction angle is adjusted by the pitch of a diffraction pattern. In this example, for instance, a diffraction pattern having five steps is used.

Figure 14:
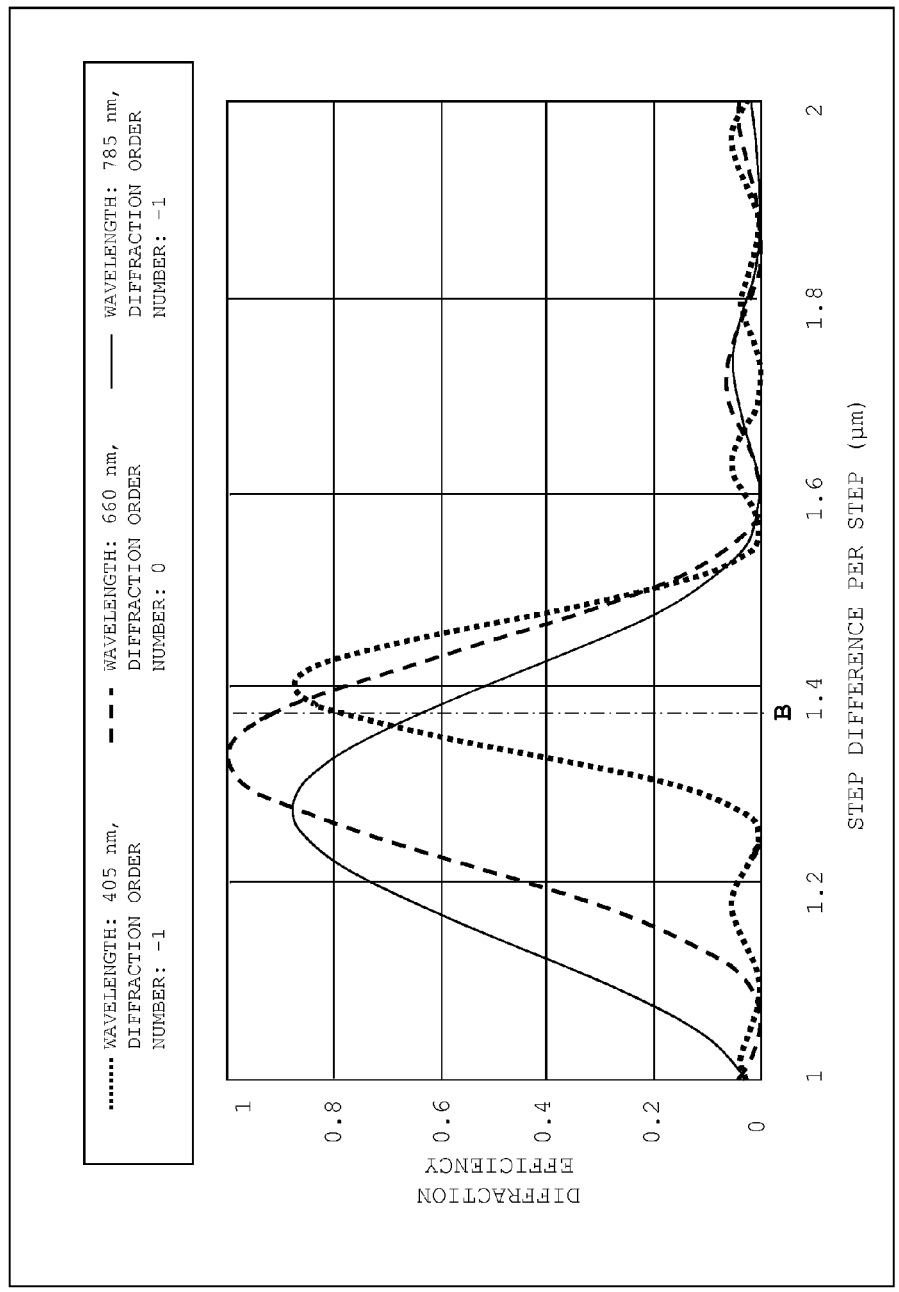
FIG. 14 is a diagram for describing a characteristic of a spectral element in the inventive example.

FIG. 14 is a characteristic diagram showing a simulation result of a relation between a step per step and a diffraction efficiency, in a diffraction pattern having five steps. In this case, by setting the step per step to the height B as shown in FIG. 14, it is possible to set the zero-th order diffraction efficiency with respect to DVD light to 90% or more, set the minus first order diffraction efficiency with respect to BD light to 80% or more, and set the minus first order diffraction efficiency with respect to CD light to 60% or more.

Figure 15:
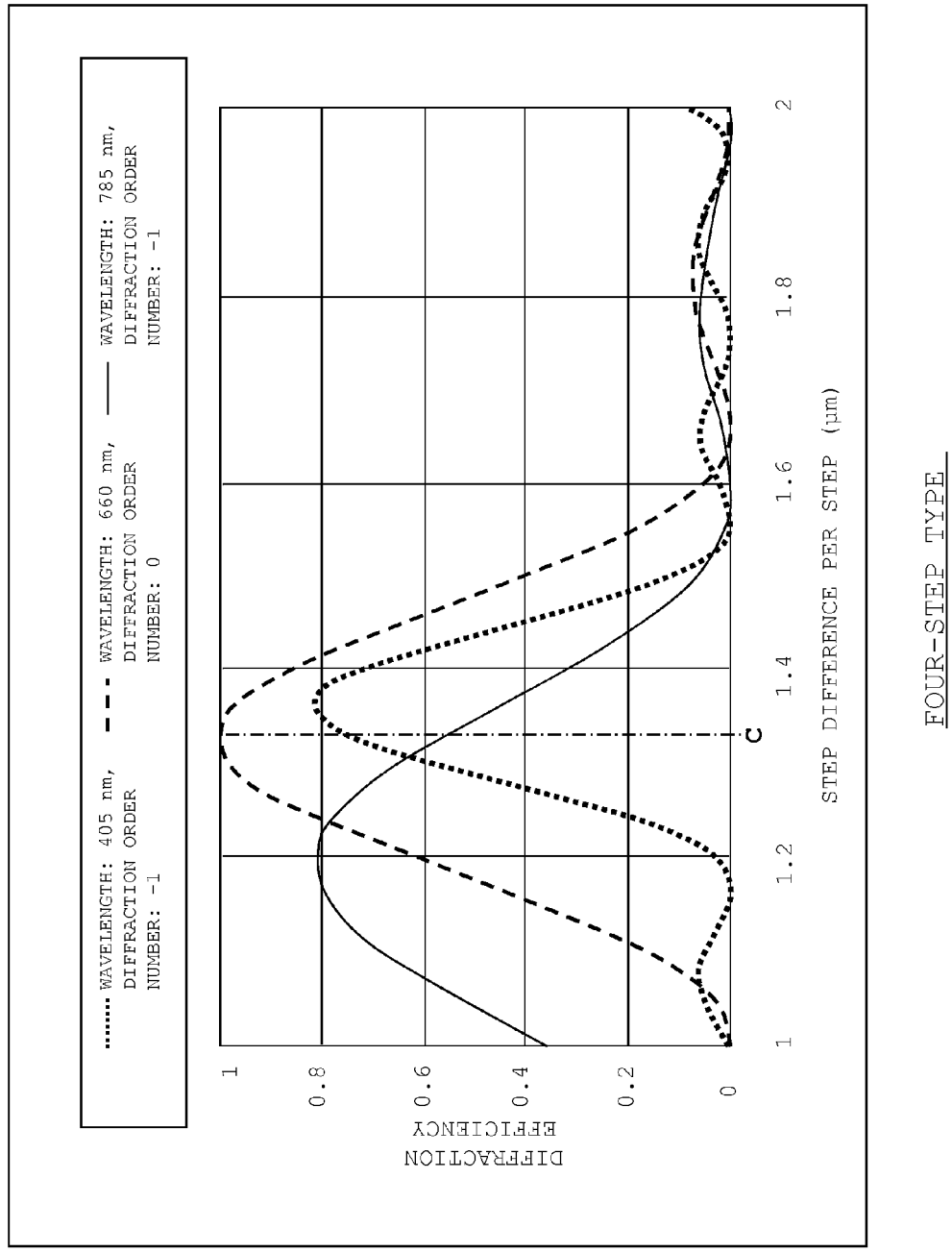
FIG. 15 is a diagram for describing a characteristic of a spectral element in the inventive example.

Further, it is possible to set the number of steps of a diffraction pattern to be formed on the diffraction areas 110a through 110d to the other number. FIG. 15 is a characteristic diagram showing a simulation result of a relation between a step per step and a diffraction efficiency, in a diffraction pattern having four steps. In this case, by setting the step per step to the height C as shown in FIG. 15, it is possible to set the zero-th order diffraction efficiency with respect to DVD light to approximately 100%, set the minus first order diffraction efficiency with respect to BD light to 70% or more, and set the minus first order diffraction efficiency with respect to CD light to 50% or more.

As described above, in this example, since the zero-th order diffraction efficiency of the diffraction areas 110a through 110d with respect to DVD light is set high, DVD light is guided to the photodetector 111 substantially without diffraction by the spectral element 110. As shown in FIG. 11C, three four-division sensors P41 through P43 (DVD sensor group) are disposed on the photodetector 111 for respectively receiving a main beam M and two sub beams S1 and S2 of DVD light that has been transmitted through the spectral element 110 without diffraction. In this example, a spacing S1 between the DVD sensor group, and the BD sensor group and the CD sensor group corresponds to the gap G2 shown in FIG. 11B. Specifically, the spacing 51 is set depending on the gap G2 between the emission points, or conversely, the gap G1 between the emission points is set depending on the spacing S1. Then, the positions of the semiconductor laser 101 and the photodetector 111 are adjusted so that BD light, CD light, and DVD light are properly irradiated onto the respective sensor groups shown in FIG. 11C, and the rotational position of the diffraction grating 102 about an optical axis is also adjusted.

In this example, an arrangement based on the conventional astigmatism method and three-beam push-pull method is applied to DVD light, instead of applying an arrangement based on the above technical principle. As a result, stray light of DVD light may be superimposed on the three four-division sensors constituting the DVD sensor group. The conventional astigmatism method and three-beam push-pull method are applied to DVD light for the following reasons.

DVD-RAM out of various DVDs has a considerably large track pitch as compared with the other DVDs. Accordingly, if DVD light is converged on a track of DVD-RAM, a track image may occupy a large ratio with respect to a beam light flux of DVD light reflected on DVD-RAM. In this state, it is difficult to precisely generate a push-pull signal (tracking error signal) by a one-beam push-pull method. In view of the above, in this example, a three-beam method is used as a method for generating a push-pull signal.

In this example, it may be possible to apply an arrangement based on the above technical principle to three separated beams i.e. a main beam and two sub beams. In this case, however, it is necessary to configure the spectral element 110 to process three beams, which may make the arrangement of the spectral element 110 complicated. Further, since it is necessary to precisely adjust the position of the spectral element 110 with respect to three beams, the position adjusting operation may become cumbersome.

For the aforementioned reasons, in this example, the conventional astigmatism method and three-beam push-pull method are applied to DVD light. This enables to avoid signal deterioration due to stray light in the case where the optical pickup device is used for BD and CD, and enables to use the optical pickup device without failure as well as for DVD-RAM.

As described above, this example is advantageous in avoiding incidence of unwanted stray light onto the BD sensor group and the CD sensor group. Further, this advantage can be realized by a simplified arrangement of disposing the spectral element 110 between the detection lens 109 and the photodetector 111. In other words, this example is advantageous in preventing incidence of stray light onto the BD sensor group and the CD sensor group with a simplified arrangement.

Further, in this example, since the spectral element 110 is acted on BD light and CD light having a wavelength difference of about two times, it is possible to make a diffraction angle difference large even in the case where both of BD light and CD light are separated by the minus first order diffraction as described above. This enables to set the signal light area of CD light larger than the signal light area of BD light on the light receiving surface, thereby providing an advantage that the BD sensor group and the CD sensor group are easily disposed.

Furthermore, in this example, the spectral element 110 is configured to respectively guide the separated light fluxes of BD light and the separated light fluxes of CD light to four different vertex positions of a square on the light receiving surface of the photodetector 111. This enables to make the signal light area of BD light and the signal light area of CD light compact, thereby making the disposing areas of the BD sensor group and the CD sensor group compact.

Furthermore, in this example, a conventional astigmatism method and three-beam push-pull method are used as a method for generating a focus error signal and a push-pull signal (tracking error signal) with respect to DVD light. This enables to properly generate a focus error signal and a push-pull signal (tracking error signal) for DVD-RAM, without making the arrangement of the spectral element 110 complicated and without making the disposition adjustment cumbersome.

Furthermore, in this example, since the laser elements for emitting BD light, CD light, and DVD light are accommodated in one CAN, the arrangement of the optical system can be simplified. In this arrangement, since the emission point BE of BD light and the emission point CE of CD light are disposed close to each other, it is possible to guide BD light to the BD sensor group (sensing portions P21 through P28) and to guide CD light to the CD sensor group (sensing portions P31 through P38) respectively without aligning optical axes of BD light and CD light.

Furthermore, the gap G2 between the emission point DE of DVD light, and the emission points BE and CE of BD light and CD light is set depending on the spacing S1 between the DVD sensor group (four-division sensors P41 through P43), and the BD sensor group (sensing portions P21 through P28) and the CD sensor group (sensing portions P31 through P38). This enables to guide DVD light to the DVD sensor group (four-division sensors P41 through P43) without additionally providing an optical element.

Figure 16:
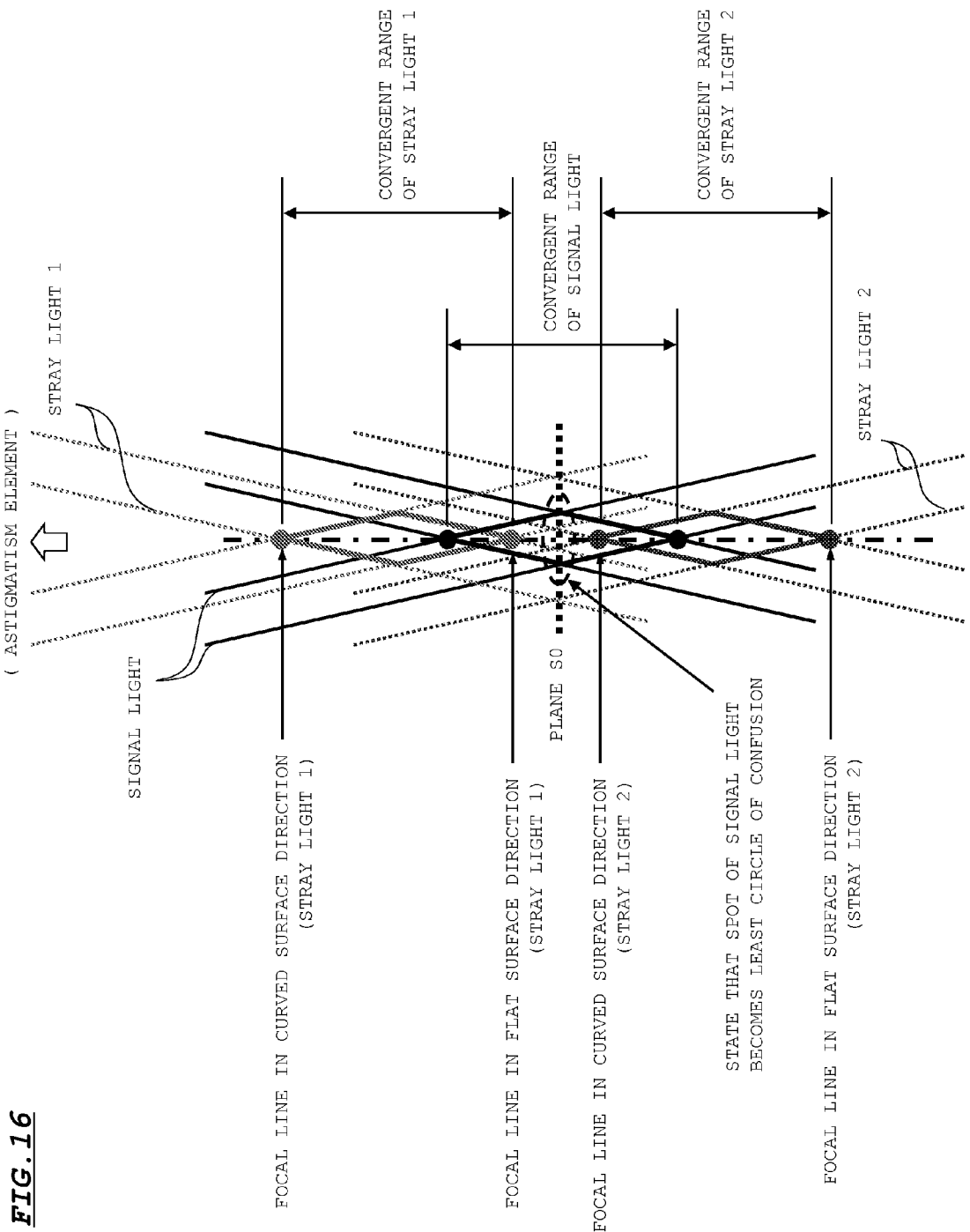
FIG. 16 is a diagram showing a preferable range of the technical principle to be applied to the inventive example and the invention.

An example based on the above principle has been described as above. The advantage based on the above principle is obtained, as shown in FIG. 16, in the case where the focal line position of stray light 1 in the flat surface direction is close to the astigmatism element with respect to the plane S0 (surface where the spot of signal light becomes a least circle of confusion), and the focal line position of stray light 2 in the curved surface direction is away from the astigmatism element with respect to the plane S0. Specifically, as far as the above relation is satisfied, the distribution state of signal light, and stray light 1 and 2 is as shown in FIGS. 8A through 8D, which makes it possible to prevent signal light, and stray light 1 and 2 from superimposing with each other on the plane S0. In other words, as far as the above relation is satisfied, the advantage of the invention and the inventive example based on the above principle is obtained even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

The embodiment of the invention may be modified in various ways other than the above.

Figure 17B:
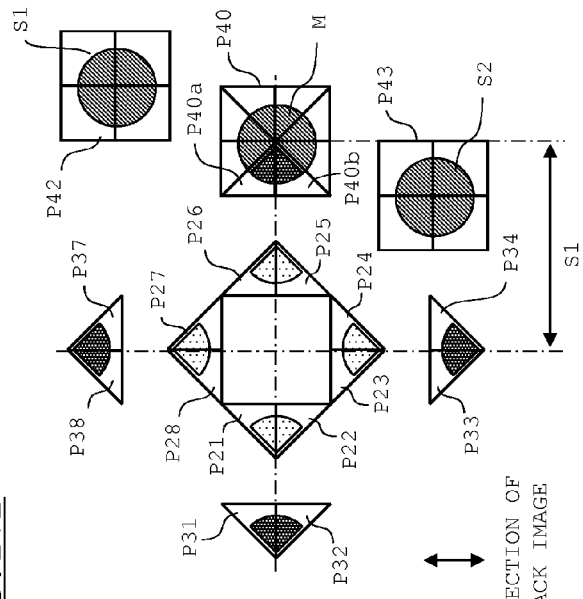
FIGS. 17A through 17C are diagrams showing an optical system of an optical pickup device, a layout of sensor groups, and an arrangement of a semiconductor laser in a modification example.
Figure 17C:
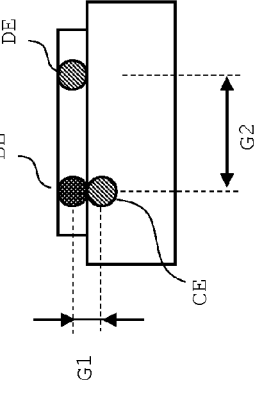
Figure 17A:
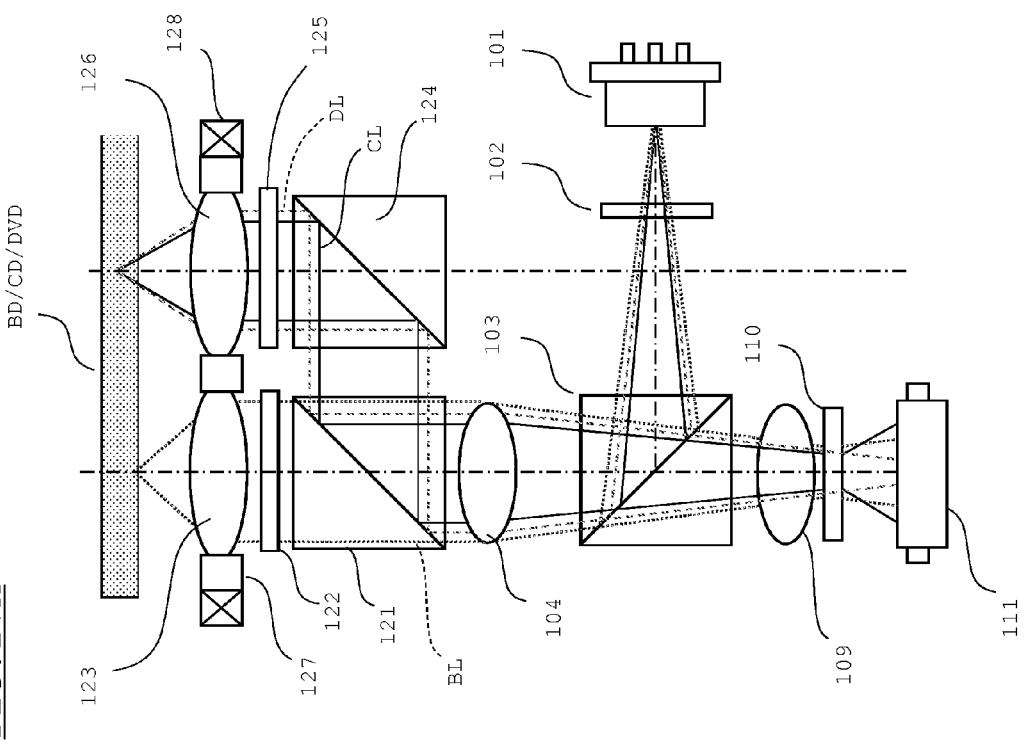

For instance, in the above example, BD light, CD light, and DVD light are allowed to enter into the single objective lens 106. Alternatively, BD light, CD light, and DVD light may be allowed to enter into different objective lenses. For instance, as shown in FIG. 17A, BD light may be entered into an objective lens 123, and CD light and DVD light may be entered into an objective lens 126. In the modification, BD light is entered into the objective lens 123 through a quarter wavelength plate 122, after having been transmitted through a dichroic prism 121, and CD light and DVD light are reflected on a mirror 124 after having been reflected on the dichroic prism 121, and enter into the objective lens 126 through a quarter wavelength plate 125. The objective lens 123 is configured to properly converge BD light on BD, and the objective lens 126 is configured to properly converge CD light and DVD light on CD and DVD, respectively. Further, the objective lenses 123 and 126 are held on a holder 127, and are integrally driven by an actuator 128.

Further, in the above example, the BD sensor group, the CD sensor group, and the DVD sensor group are individually disposed. Alternatively, as shown in FIG. 17B, a part of the CD sensor group and a part of the DVD sensor group may share and use the same sensing portion. In the modification, a sensing portion P40 for receiving a main beam M is constituted of an eight-division sensor obtained by dividing each sensing portion of a four-division sensor into two; and left-side two sensing portions P40a and P40b of the eight-division sensor are shared and used as a sensing portion for receiving right-side separated light fluxes of CD light. With this arrangement, since the spacing S1 between the DVD sensor group, and the BD sensor group and the CD sensor group can be reduced, the whole size of the sensor groups can be made compact.

Further, in the above example, there has been described an arrangement example wherein the respective laser elements for emitting BD light, CD light, and DVD light are mounted in a monolithic state. Alternatively, as shown in FIG. 17C, these laser elements may be mounted in a hybrid state.

In the above example, BD light and CD light are entered into the spectral element 110 with optical axis displaced from each other. Alternatively, CD light and BD light may be entered into the spectral element 110 with optical axis aligned with each other. In the modification, for instance, as shown in FIG. 18A, the optical axes of CD light and BD light may be aligned with each other by using a transparent parallel flat plate 130.

FIG. 18B is a diagram for describing a function of correcting optical axis displacement by the parallel flat plate 130.

Assuming that a thickness of the parallel flat plate 130 is "t", the inclination of the parallel flat plate 130 with respect to an optical axis is "a", and the refractive index of the parallel flat plate 130 is "n", the shift amount "h" of an optical axis by the parallel flat plate 130 (displacement amount of an optical axis of laser light before and after transmitting through the parallel flat plate 130) is expressed by the following equation.

$$h = t/\cos(\sin^{-1}(\sin(a)/n)) * \sin(a)$$

Since the refractive index "n" of the parallel flat plate 130 changes depending on the wavelength of light, the shift amount of an optical axis changes between a case that CD light (wavelength: 785 nm) passes and a case that BD light (wavelength: 405 nm) passes. Specifically, as shown in FIG. 18B, the shift amount of the optical axis of BD light is large as compared with the shift amount of the optical axis of CD laser light, due to the wavelength difference.

If BD light and CD light are entered into the parallel flat plate 130 as shown in FIG. 18B, the optical axis of BD light comes closer to the optical axis of CD light by the difference in shift amount between BD light and CD light. Accordingly, adjusting the thickness "t" and the inclination angle "a" of the parallel flat plate 130 based on the above equation enables to align the optical axes of BD light and CD light after transmitting through the parallel flat plate 130.

In the above case, although the optical axis of DVD light is also shifted by the function of the parallel flat plate 130, as shown in FIG. 11B, since the emission point DE of DVD light is disposed in a direction perpendicular to the direction along which the emission point BE of BD light and the emission point CE of CD light are aligned, there is no likelihood that the optical axis of DVD light may come close to the optical axes of BD light and CD light, even if the optical axis of DVD light is shifted by the function of the parallel flat plate 130.

In the modification example shown in FIG. 18A, BD light and CD light are allowed to uniformly enter into the diffraction areas 110a through 110d of the spectral element 110 with optical axes aligned. Accordingly, as shown in FIG. 17B, both of BD light and CD light are allowed to enter into the respective corresponding sensor groups in a quarter-circle shape with no distortion. This enables to further enhance the precision of a signal to be outputted from the photodetector 111. The parallel flat plate may be disposed between the PBS and the spectral element, or the functions of the parallel flat plate and the PBS can be integrated by forming the PBS into a flat shape. Further alternatively, the optical axes of BD light and CD light may be aligned with each other by using other optical elements such as a diffraction grating having wavelength selectivity.

Further alternatively, the optical axes of BD light and CD light may be aligned with each other in the optical system shown in FIG. 17A in the similar manner as described above.

Further, in the above example, the spectral element 110 is disposed posterior to the detection lens 109. Alternatively, the spectral element 110 may be disposed anterior to the detection lens 109. Further, in the above example, CD light is entered into the objective lens 106 in an infinite system. Alternatively, CD light may be entered into the objective lens 106 in a finite system. The modification also enables to prevent incidence of stray light of CD light onto the CD sensor group, as well as in the above arrangement.

Furthermore, in the above example, a three-beam push-pull method is used for DVD light. Alternatively, an in-line system may be used for DVD light. In the modification, three four-division sensors for DVD light shown in FIG. 11C are vertically arranged in a row, and the diffraction grating 102 is modified into a diffraction grating of in-line system for imparting a phase difference to beams after separation.

Furthermore, the inventive optical pickup device may be configured into an optical pickup device compatible with CBHD (China Blue High-definition Disc) using laser light of a wavelength band similar to the wavelength band of BD, as well as for CD and DVD, by changing the design of the objective lens. "Laser light for BD", and "BD" in the claims respectively embrace "laser light for CBHD" and "CBHD", as far as the doctrine of equivalence is applicable.

The embodiment of the invention may be changed or modified in various ways as necessary, as far as such changes and modifications do not depart from the scope of the claims of the invention hereinafter defined.

What is claimed is:

1. An optical pickup device comprising:
a first light source for emitting laser light for BD;
a second light source for emitting laser light for CD;
an objective lens portion for converging the laser light for BD and the laser light for CD on BD and CD, respectively;
a photodetector for receiving the laser light for BD reflected on the BD and the laser light for CD reflected on the CD; and
an optical system for guiding the laser light for BD emitted from the first light source and the laser light for CD emitted from the second light source to the objective lens portion, and for guiding the laser light for BD reflected on the BD and the laser light for CD reflected on the CD to the photodetector, wherein
the optical system includes:
an astigmatism element for imparting astigmatism to the laser light for BD reflected on the BD and the laser light for CD reflected on the CD; and
a spectral element for dispersing four light fluxes of the laser light for BD by diffraction, and for dispersing four light fluxes of the laser light for CD by diffraction, the four light fluxes of the laser light for BD and the four light fluxes of the laser light for CD being obtained by dividing the laser light for BD reflected on the BD and the laser light for CD reflected on the CD by a first straight line parallel to a converging direction by the astigmatism element, and a second straight line perpendicular to the first straight line, and
the photodetector is provided with:
a first sensor group for receiving the four light fluxes of the laser light for BD dispersed by the spectral element to generate a reproduction signal, and a servo signal for use in controlling the objective lens portion; and
a second sensor group for receiving the four light fluxes of the laser light for CD dispersed by the spectral element to generate a reproduction signal, and a servo signal for use in controlling the objective lens portion.

2. The optical pickup device according to claim 1, wherein the spectral element is configured to respectively guide the separated light fluxes of the laser light for BD and the separated light fluxes of the laser light for CD to four vertex positions of a square on a light receiving surface of the photodetector.

3. The optical pickup device according to claim 1, further comprising
a third light source for emitting laser light for DVD, wherein
the first light source, the second light source, and the third light source are disposed with a predetermined gap in a housing in such a manner that emission directions thereof are aligned in one direction,
the optical system guides the laser light for DVD emitted from the third light source to the objective lens portion, and guides the laser light for DVD reflected on the DVD to the photodetector,
the optical system further includes a diffraction grating which separates the laser light for DVD into a main beam and two sub beams, out of the laser light for BD, the laser light for CD, and the laser light for DVD,
the photodetector is provided with a third sensor group which receives the main beam and the two sub beams of the laser light for DVD transmitted through the spectral element without diffraction to generate a reproduction signal, and a servo signal for use in controlling the objective lens portion, and
the gap between the first light source and the second light source, and the third light source is defined to guide the main beam and the two sub beams of the laser light for DVD to the third sensor group.

4. The optical pickup device according to claim 3, wherein a part of the third sensor group and a part of the second sensor group share and use the same sensor.

5. The optical pickup device according to claim 3, further comprising
an optical axis correcting element for aligning an optical axis of the laser light for BD and an optical axis of the laser light for CD.

6. The optical pickup device according to claim 5, wherein the optical axis correcting element is a transparent parallel flat plate, and
the parallel flat plate is inclined with a predetermined angle with respect to the optical axis of the laser light for BD and the optical axis of the laser light for CD.

7. The optical pickup device according to claim 3, wherein the objective lens portion is provided with an objective lens which allows incidence of the laser light for BD, the laser light for CD, and the laser light for DVD.

* * * * *